(12) United States Patent
Magana-Loaiza et al.

(10) Patent No.: US 12,687,426 B2
(45) Date of Patent: Jul. 21, 2026

(54) SMART QUANTUM LIGHT DETECTOR

(71) Applicants: Omar Magana-Loaiza, Prairieville, LA (US); Chenglong You, Baton Rouge, LA (US)

(72) Inventors: Omar Magana-Loaiza, Prairieville, LA (US); Chenglong You, Baton Rouge, LA (US)

(73) Assignee: BOARD OF SUPERVISORS OF LOUISIANA STATE UNIVERSITY AND AGRICULTURAL AND MECHANICAL COLLEGE, Baton Rouge, LA (US)

( * ) Notice: Subject to any disclaimer, the term of this patent is extended or adjusted under 35 U.S.C. 154(b) by 399 days.

(21) Appl. No.: 18/026,308

(22) PCT Filed: Sep. 16, 2021

(86) PCT No.: PCT/US2021/050712
§ 371 (c)(1),
(2) Date: Mar. 14, 2023

(87) PCT Pub. No.: WO2022/061012
PCT Pub. Date: Mar. 24, 2022

(65) Prior Publication Data
US 2023/0375399 A1 Nov. 23, 2023

Related U.S. Application Data

(60) Provisional application No. 63/079,290, filed on Sep. 16, 2020.

(51) Int. Cl.
| | |
|---|---|
| *G01J 1/02* | (2006.01) |
| *G01J 1/44* | (2006.01) |
| *G06N 3/04* | (2023.01) |

(52) U.S. Cl.
CPC ........... *G01J 1/0238* (2013.01); *G01J 1/0271* (2013.01); *G01J 1/44* (2013.01); *G06N 3/04* (2013.01);
(Continued)

(58) Field of Classification Search
CPC .......... G01J 1/0238; G01J 1/0271; G01J 1/44; G01J 2001/442; G01J 2001/448;
(Continued)

(56) References Cited

U.S. PATENT DOCUMENTS

| | | | |
|---|---|---|---|
| 10,756,817 B1 | 8/2020 | Hassan et al. | |
| 12,089,917 B2 * | 9/2024 | Feng .................... | A61B 5/0073 |

(Continued)

FOREIGN PATENT DOCUMENTS

WO 2019/113440 A1 6/2019

OTHER PUBLICATIONS

Chenglong You, Mario A. Quiroz, Aidan Lambert, Narayan Bhusal; "Identification of light sources using machine learning", AIP Publishing, vol. 7, issue 2 (Year: 2020).*

(Continued)

*Primary Examiner* — Manuel A Rivera Vargas
(74) *Attorney, Agent, or Firm* — Venable LLP; Ryan T. Ward

(57) ABSTRACT

A method and system for identification of light source types includes detecting individual photons for a measurement time period to provide a times series of individual photon events, segmenting the time series into a plurality of time bins, and determining a number of detected photons within each time bin to provide a time series of photon counts, determining a probability distribution P(n) from the time series of photon counts, the probability distribution providing the probability of detection of n photons (n=0 . . . $n_{max}$), inputting each of the values of P(n) as a $n_{max}$+1 component (Continued)

feature vector into a single neuron neural network that has been previously trained on a plurality of light source types, and receiving as output a classifier that has a value that identifies the light source type. An average number of photons in the plurality of time bins is less than one photon.

20 Claims, 20 Drawing Sheets

(52) U.S. Cl.
CPC ... *G01J 2001/442* (2013.01); *G01J 2001/448* (2013.01)

(58) Field of Classification Search
CPC ...... G01J 1/0228; G01J 1/0418; G01J 1/0433; G06N 3/04; G06N 3/045; G06N 7/01; G06N 3/084
See application file for complete search history.

(56) References Cited

U.S. PATENT DOCUMENTS

| | | | | |
|---|---|---|---|---|
| 2013/0088705 A1* | 4/2013 | Asahara | ................... | G01S 17/58 |
| | | | | 356/28.5 |
| 2016/0139392 A1* | 5/2016 | Yamaguchi | ........ | G02B 21/0084 |
| | | | | 359/393 |
| 2019/0239753 A1* | 8/2019 | Wentz | ................... | G01J 3/2803 |
| 2019/0336005 A1* | 11/2019 | Alford | ................. | A61B 5/4064 |
| 2020/0284907 A1 | 9/2020 | Gupta et al. | | |
| 2020/0372334 A1* | 11/2020 | Carolan | .................... | G02F 1/35 |
| 2022/0113189 A1* | 4/2022 | Moon | ................... | G01J 3/2889 |
| 2023/0367176 A1* | 11/2023 | Clemmen | .............. | G02F 1/395 |

OTHER PUBLICATIONS

You et al., "Identification of Light Sources using Machine Learning." In: Cornell University Library/ Quantum Physics, Sep. 17, 2019, [online] [retrieved on Nov. 10, 2021 (Nov. 10, 2021 )] Retrieved from the Internet< URL: https://arxiv.org/abs/1909.08060 >.
Sudarshan, "Equivalence of Semiclassical and Quantum Mechanical Descriptions of Statistical Light Beams", Phys. Rev. Lett., (April 1, 2963), vol. 10, No. 7, pp. 277-279.
Bhusal et al., "Spatial Mode Correction of Single Photons using Machine Learning", Adv. Quantum Technol., (2021), vol. 4, 2000103, (7 pages).
You et al., "Observation of the modification of quantum statistics of plasmonic systems", Nature Communications, (2021), vol. 12, (5 pages).
Møller, "A Scaled Conjugate Gradient Algorithm for Fast Supervised Learning", Neural Networks, (1993), vol. 6, pp. 525-533.
Kullback et al., "On Information and Sufficiency", The Annals of Mathematical Statistics, (Mar. 1951), vol. 22, No. 1, pp. 79-86.
Prechelt, "Early stopping—but when?", in Neural Networks: Tricks of the Trade, edited by G. B. Orr and K.-R. Müller (Springer Berlin Heidelberg, Berlin, Heidelberg, 1998) pp. 55-69.
Crowther et al., "A Method for Optimal Division of Data Sets for Use in Neural Networks", in LNAI, (2005), 3684, (7 pages).
Mirhosseini et al., "Compressive Direct Measurement of the Quantum Wavefunction", Physical Review Letters, (Aug. 29, 2014), vol. 113, pp. 090402- to 090402-5.
Magana-Loaiza et al., "Compressive Object Tracking using Entangled Photons", Applied Physics Letters, (2013), vol. 102,(10 pages).
Glauber, " The Quantum Theory of Optical Coherence," Phys. Rev., (Jun. 15, 1963), vol. 130, No. 6, pp. 2529-2539.
Mandel, "Sub-Poissonian photon statistics in resonance fluorescence", Optics Letters, (Jul. 1979), vol. 4, No. 7, pp. 205-207.
Mandel et al., " Coherence Properties of Optical Fields," Rev. Mod. Phys., (Apr. 1965), vol. 37, No. 2, pp. 231-287.

Liu et al., " Nth-order coherence of thermal light," Phys. Rev. A, (2009), vol. 79, pp. 023819-1 to 023819- 15.
Hlouek et al., "Accurate Detection of Arbitrary Photon Statistics," Phys. Rev. Lett., (2019), vol. 123, 153604-1 to 153604-7.
Dovrat et al., " Measurements of the dependence of the photon-number distribution on the number of modes in parametric down-conversion," Opt. Express, (Jan. 30, 2012), vol. 20, No. 3, pp. 2266-2276.
Dovrat et al., "Direct observation of the degree of correlations using photon-No. resolving detectors," Phys. Rev. A, (2013), vol. 87, 053813-1 to 053813-5.
Zambra et al., "Experimental Reconstruction of Photon Statistics without Photon Counting," Phys. Rev. Lett., (Aug. 5, 2005), vol. 95, 063602-1 to 063602- 4.
Howard et al., "Optimal Imaging of Remote Bodies Using Quantum Detectors," Phys. Rev. Lett., (2019), vol. 123, p. 143604-1 to 143604-6.
Ling et al., " Accuracy of minimal and optimal qubit tomography for finite-length experiments," arXiv pre-print arXiv:0807.0991, (Jul. 7, 2008), (5 pages).
Dowling et al., "Quantum Optical Technologies for Metrology, Sensing, and Imaging," J. Light. Technol., (Jun. 15, 2015, vol. 33, No. 12, pp. 2359-2370.
Sher et al., " Low Intensity LiDAR using Compressed Sensing and a Photon No. Resolving Detector," Emerging Digital Micromirror Device Based Syst. Appl. X 10546, 105460J (Feb. 22, 2018), (7 pages).
Wang et al., "Optimal detection strategy for super-resolving quantum LiDAR," J. Appl. Phys., (Jan. 13, 2016), vol. 119, 023109-1 to 023109-8.
Dowling, " Quantum optical metrology—the lowdown on High-NOON states," Contemp. Phys., (Mar.-Apr. 2008), vol. 49, No. 2, pp. 125-143.
Magaña-Loaiza et al., "Multiphoton quantum-state engineering using conditional measurements," Npj Quantum Inf. 5, (2019), vol. 80, (7 pages).
Magaña-Loaiza et al., "Quantum imaging and information," Rep. Prog. Phys., (2019), vol. 82, 124401, (29 pages).
Lecun et al., "Deep learning," Nature, (May 28, 2015), vol. 521, pp. 436-444.
Carleo et al., "Machine learning and the physical sciences," Rev. Mod. Phys., (Oct.-Dec. 201), vol. 91, No. 4, pp. 045002-1 to 045002-39.
Biamonte et al., "Quantum machine learning," Nature, (Sep. 14, 2017), vol. 549, pp. 195-202.
Dunjko et al.," Quantum-Enhanced Machine Learning," Phys. Rev. Lett., (Sep. 23, 2016), vol. 117, pp. 130501-1 to 130501-6.
Hentschel et al., " Machine Learning for Precise Quantum Measurement," Phys. Rev. Lett., (Feb. 12, 2010) vol. 104, pp. 063603-1 to 063603-4.
Lumino et al., "Experimental Phase Estimation Enhanced by Machine Learning," Phys. Rev. Appl., (2018), vol. 10, pp. 044033-1 to 044033-13.
Melnikov et al., "Active learning machine learns to create new quantum experiments," PNAS, (Feb. 6, 2018), vol. 115, No. 6, pp. 1221-1226.
Cortes et al., "Accelerating quantum optics experiments with statistical learning," Applied Physics Letters, (2020), vol. 116, pp. 184003-1 to 184003-5.
Kudyshev et al., "Rapid Classification of Quantum Sources Enabled by Machine Learning," Adv. Quantum Technol., (2020), vol. 3, (8 pages).
Lohani et al., "Turbulence correction with artificial neural networks," Opt. Lett., (Jun. 1, 2018), vol. 43, No. 11, pp. 2611-2614.
Gao ett al., "Experimental Machine Learning of Quantum States," Phys. Rev. Lett., (2018), vol. 120, pp. 240501-1 to 240501-6.
Torlai et al., "Neural-network quantum state tomography," Nat. Phys., (2018), vol. 14, pp. 447-450.
Flamini et al., "Visual assessment of multi-photon interference," Quantum Sci. Technol., (2019), vol. 4, (11 pages).
Agresti et al., "Pattern Recognition Techniques for Boson Sampling Validation," Phys. Rev. X, 9, (2019), pp. 011013-1 to 011013-14.

(56)     References Cited

OTHER PUBLICATIONS

Rafsanjani et al., "Quantum-enhanced interferometry with weak thermal light," Optica, (Apr. 2017), vol. 4, No. 4, pp. 487-491.

Burenkov et al., "Full statistical mode reconstruction of a light field via a photon-No. resolved measurement," Phys. Rev. A, (2017), vol. 95, 053806-1 to 053806-6.

Montaut et al., "Compressive characterization of telecom photon pairs in the spatial and spectral degrees of freedom," Optica, (Nov. 2018), vol. 5, No. 11, pp. 1418-1423.

Windrow et al., " Adaptive switching circuits," " Technical report No. 1553-1," Stanford University, Stanford-California, Stanford Electronics Laboratories (Jun. 30, 1960).

Gallant, "Neural Network Learning and Expert Systems", Artificial Intelligence in Engineering, (1993), vol. 8, pp. 315-316.

Helstrom, "Quantum Detection and Estimation Theory", Journal of Statistical Physics, (1969), vol. 1, No. 2, pp. 231-252.

Puchala et al., " Distinguishability of generic quan-tum states," Phys. Rev. A, (2016), vol. 93, pp. 062112-1 to 062112-12.

Chernoff, "A Measure of Asymptotic Efficiency for Tests of a Hypothesis Based on the Sum of Observations," Ann. Math. Stat., (1952), vol. 23, pp. 493-507.

Audenaert et al., "Discriminating States: The Quantum Chernoff Bound," Phys. Rev. Lett., (Apr. 20, 2007), vol. 98, pp. 160501-1 to 160501-4.

Cohen et al., " Thresholded quantum LiDAR: Exploiting photon-No. resolving detection," Phys. Rev. Lett., (2019), vol. 123, 203601-1 to 203601-5.

Cauchy, Méthode générale pour la résolution des systemes d'équations simultanées, Comp. Rend. Sci. Paris 25., 1847, pp. 536-538 (1847).

Goodfellow et al., "Deep learning", MIT press (2016).

Abbe, Beiträge zur theorie des mikroskops und dermikroskopischen wahrnehmung, Archiv für mikroskopis-che Anatomie 9, 413 (1873).

Rayleigh, "V. Investigations in Optics, with special reference to the Spectroscope", Philosophical Magazine Series 5, (1880), 9:53, 40-55.

Won, "Eyes on super-resolution", Nat. Photonics, (Jul. 2009), vol. 3, (3 pages).

Stelzer "Beyond the diffraction limit?", Nature, (Jun. 20, 2002), vol. 417, pp. 806-807.

Kolobov et al., Quantum Limits on Optical Resolution, Phys. Rev. Lett. 85, 3789 (Oct. 30, 2000).No. 18, pp. 3789-3792.

Sheppard, "The uncertainty principle applied to estimate focal spot dimensions", Opt. Commun., (Mar. 1, 2001), vol. 189, (2 pages).

Pirandola et al., "Advances in Photonic Quantum Sensing", Nat. Photon., (Nov. 5, 2018), vol. 12, (12 pages).

Hell et al., "The 2015 super-resolution microscopy roadmap", J. Phys. D: Appl. Phys., (2015), vol. 48, 443001, (36 pages).

Tsang, "Quantum Imaging beyond the Diffraction Limit by Optical Centroid Measurements", Phys. Rev. Lett., (Jun. 26, 2009), vol. 102, pp. 253601-1 to 253601-4.

Tsang et al., "Quantum Theory of Superresolution for Two Incoherent Optical Point Sources", Phys. Rev. X , (2016), vol. 6, pp. 031033-1 to 031033-17.

Hell et al., "Breaking the diffraction resolution limit by stimulated emission: stimulated-emission-depletion fluorescence microscopy", Opt. Lett., (Jun. 1, 1994), vol. 19, No. 11, pp. 780-782.

Paur et al., "Tempering Rayleigh's curse with PSF shaping", Optica, (Oct. 2018), vol. 5, No. 10, pp. 1177-1180.

Tamburini et al., "Overcoming the Rayleigh Criterion Limit with Optical Vortices", Phys. Rev. Lett., (Oct. 20, 2006), vol. 97, pp. 163903-1 to 163903-4.

Tham et al., "Beating Rayleigh's Curse by Imaging Using Phase Information", Phys. Rev. Lett., (Feb. 17, 2017), vol. 118, pp. 070801-1 to 070801-6.

Zhou et al., "Quantum-limited estimation of the axial separation of two incoherent point sources", Optica, (May 2019), vol. 6, No. 5, pp. 534-541.

Boucher et al., "Spatial optical mode demultiplexing as a practical tool for optimal transverse distance estimation", Optica, (Nov. 2020), vol. 7, No. 11, pp. 1621-1626.

Larson et al., "Resurgence of Rayleigh's curse in the presence of partial coherence", Optica, (Nov. 2018), vol. 5, No. 11, pp. 1382-1389.

Liang et al., "Coherence effects on estimating two-point separation", Optica, (Feb. 2021), vol. 8, No. 2, pp. 243-248.

Boto et al., "Quantum Interferometric Optical Lithography: Exploiting Entanglement to Beat the Diffraction Limit", Phys. Rev. Lett., (Sep. 25, 2000), vol. 85, No. 13, pp. 2733-2736.

Tang et al., "Fault-tolerant and finite-error localization for point emitters within the diffraction limit", Opt. Express , (Sep. 5, 2016), vol. 24, No. 19, (9 pages).

Parniak et al., "Beating the Rayleigh Limit using Two-Photon Interference", Phys. Rev. Lett., (2018), vol. 121, pp. 250503- to 250503-6.

Giovannetti et al., "Sub-Rayleigh-diffraction-bound quantum imaging", Phys. Rev. A, (2009), vol. 79, pp. 013827-1 to 013827-4.

You et al., "Identification of light sources using machine learning", Appl. Phys. Rev., (2020), vol. 7, (8 pages).

* cited by examiner

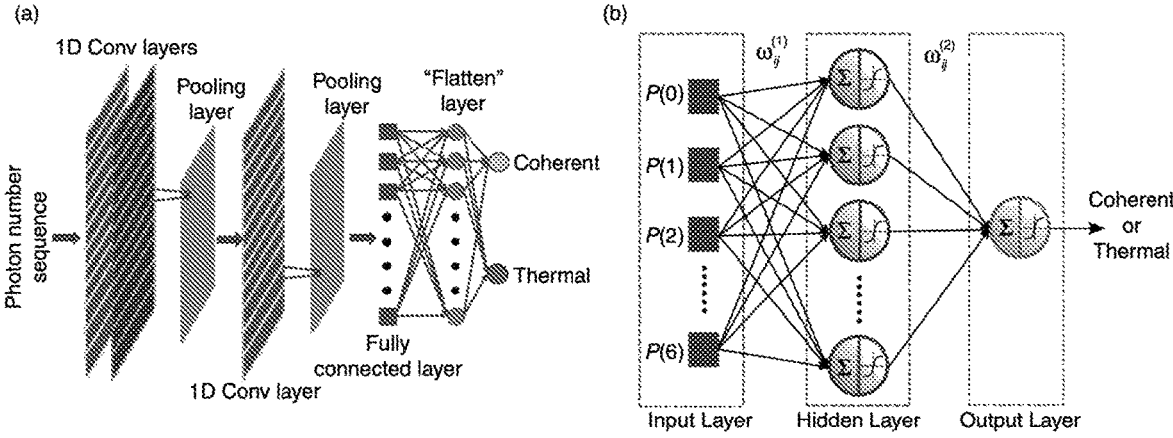
FIG. 10A                    FIG. 10B

SMART QUANTUM LIGHT DETECTOR

CROSS REFERENCE TO RELATED APPLICATIONS

The present patent application is a U.S. National Stage of PCT/US2021/050712, filed Sep. 16, 2021, which claims priority benefit to U.S. Provisional Application No. 63/079,290 filed on Sep. 16, 2020, the entire content of which is incorporated herein by reference. All references cited anywhere in this specification, including the background and detailed description sections, are incorporated by reference as if each had been individually incorporated.

BACKGROUND

1. Technical Field

The presently claimed embodiments of the current invention relate to light detectors, methods of light detection and systems that include such detectors and/or methods; and more particularly to such detectors, methods and systems that use neural networks for characterization of light sources.

2. Discussion of Related Art

The underlying statistical fluctuations of the electromagnetic field have been widely utilized to identify diverse sources of light. In this regard, the Mandel parameter constitutes an important metric to characterize the excitation mode of the electromagnetic field and consequently to classify light sources. Similarly, the degree of optical coherence has also been extensively utilized to identify light sources. Despite the fundamental importance of these quantities, they require large amounts of data, which impose practical limitations. This problem has been partially alleviated by incorporating statistical methods, such as bootstrapping, to predict unlikely events that are hard to measure experimentally. Unfortunately, the constraints of these methods severely impact the realistic implementation of photonic technologies for metrology, imaging, remote sensing, and microscopy.

The potential of machine learning (ML) has motivated novel families of technologies that exploit self-learning and self-evolving features of artificial neural networks to solve a large variety of problems in different branches of science. Conversely, quantum mechanical systems have provided new mechanisms to achieve quantum speedup in machine learning. In the context of quantum optics, there has been an enormous interest in utilizing machine learning to optimize quantum resources in optical systems. As a tool to characterize quantum systems, machine learning has been successfully employed to reduce the number of measurements required to perform quantum state discrimination, quantum separability, and quantum state tomography.

However, there remains a need to perform discrimination of light sources at extremely low light levels.

SUMMARY OF THE DISCLOSURE

An aspect of the present invention is to provide a method for identification of light source types. The method includes detecting individual photons for a measurement time period to provide a times series of individual photon events. The method further includes segmenting the time series into a plurality of time bins, and determining a number of detected photons within each time bin of the plurality of time bins to provide a time series of photon counts per time bin. The method also includes determining a probability distribution $P(n)$ from the time series of photon counts per time bin, the probability distribution providing the probability of detection of n photons, wherein $n=0, 1, 2, \ldots, n_{max}$, inputting each of the values of $P(n)$ as a $n_{max}+1$ component feature vector into a single neuron neural network, the single neuron neural network having been previously trained on a plurality of light source types, and receiving as output a classifier that has a value that identifies the light source type. An average number of photons in the plurality of time bins is less than one photon.

Another aspect of the present disclosure is to provide a light detection system for detecting light from a classified type of light source. The light detection system includes a light detector, and a processing system configured to communicate with said light detector to receive signals to be processed. The processing system is constructed to perform the method for identification of light source types in the above paragraph.

A further aspect of the present invention is to provide an optical imaging system for forming images from a classified type of light source. The optical imaging system includes a plurality of light detectors arranged in a patterned array; and a processing system configured to communicate with said plurality light detectors to receive signals to be processed to provide an image from said classified type of light source. The processing system is constructed to perform the method for identification of light source types in the above paragraph.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. All references cited anywhere in this specification, including the Background and Detailed Description sections, are incorporated by reference as if each had been individually incorporated.

FIG. 10A is a schematic structure representation one-dimensional convolutional neural network 1D-CNN), according to an embodiment of the present invention;

FIG. 10B is a schematic structure representation of a multilayer neural network (MNN) used for demonstration of light source identification, according to another embodiment of the present invention;

DETAILED DESCRIPTION

Figure 1:
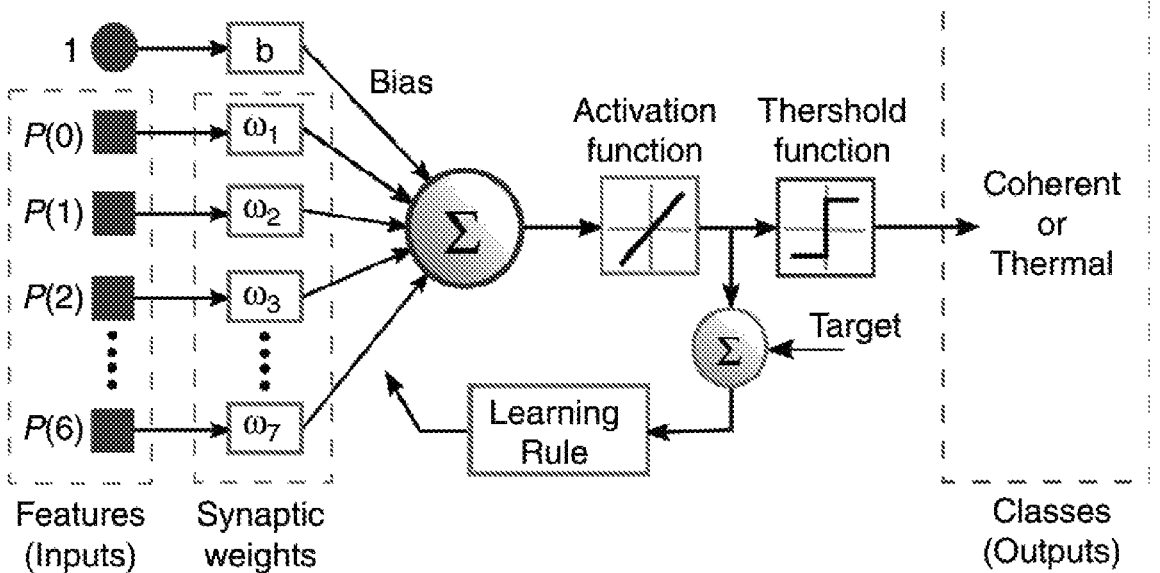
FIG. 1 is a flow diagram showing the structure of ADAptive LINear Element (ADALINE) model, according to an embodiment of the present invention.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed, and other methods developed, without departing from the broad concepts of the present invention. All references cited anywhere in this specification are incorporated by reference as if each had been individually incorporated.

As used herein, the term "light" is intended to have a broad meaning to regions of the electromagnetic spectrum that are both visible and not visible to the human eye. For example, the term light is intended to include, but is not limited to, visible light, infrared light (IR) and ultraviolet light (UV).

According to some embodiments of the current invention, we demonstrate the potential of machine learning (ML) to perform discrimination of light sources at extremely low light levels. This is achieved, according to an embodiment of the current invention, by training single artificial neurons with the statistical fluctuations that characterize coherent and thermal states of light. The self-learning features of artificial neurons enable the dramatic reduction in the number of measurements and the number of photons required to perform identification of light sources. For the first time, our results demonstrate the possibility of using tens of measurements to identify light sources with mean photon numbers below one according to an embodiment of the current invention. In addition, we demonstrate similar experimental results using the naive Bayes classifier, which are outperformed by our single neuron approach. Finally, we present a discussion on how a single artificial neuron based on an ADAptive LINear Element (ADALINE) model can dramatically reduce the number of measurements required to discriminate signal photons from ambient photons. Some embodiments of the current invention can provide, for example, realistic implementation of light detection and ranging (LiDAR), remote sensing, and microscopy. However, the broad concepts of the current invention are not limited to only these particular examples.

In order to dramatically reduce the number of measurements required to identify light sources, we can make use of an ADALINE neuron according to an embodiment of the current invention. ADALINE is a single neural network model based on a linear processing element, proposed by Bernard Widrow for binary classification. In general, the neural networks undergo two-stage: training and test. In the training stage, ADALINE is capable of learning the correct outputs (named as output labels or classes) from a set of inputs, called also features, by using a supervised learning algorithm. In the test stage, this neuron produces the outputs of a set of inputs that were not in the training data, taking as reference the acquired experience in the training stage. Although we tested architectures more complex than a single neuron for the identification of light sources, we concluded that a simple ADALINE offers a suitable agreement between accuracy and simplicity. Furthermore, the training time is insignificantly small.

FIG. 1 is a flow diagram showing the structure of the ADALINE model, according to an embodiment of the present invention. In FIG. 1, P(n) denotes the probability of finding n photons for a given light source, namely, coherent or thermal. We take as an input to the neuron, the feature vector composed by the first seven probabilities of the photon number distribution, that is, P={P(0), P(1), P(2), P(3), P(4), P(5), P(6)}. With this, we achieve that the feature vector size stays fixed for a different number of data points. It is worth mentioning that the determination of an appropriate feature vector is one hard task in machine learning. Note however, that the general concepts of the current invention are not limited to a seven component feature vector as described in this example. There can be less than seven components, or greater than seven components in other embodiments of the current invention.

ADALINE infers a function from the set of training examples, which after it is used to predict output labels of new input data. The neuron's output is given by the following equation set (1).

$$a = f(z) z = \Sigma_i \omega_i x_i \tag{1}$$

5 where $x_i$ (i=0, . . . , 7) are the elements of the feature vector P. $x_0$ is a bias term and is permanently set to 1. $\omega_i$ are the synaptic weights associated to each input where $\omega_0$ corresponds to the weight of the bias and f (•) is the identity activation function which takes form of f(x)=x.

We note that the output of the activation function undergoes a binary classification given by the threshold function, there, if a is greater or equal to 0.5 then the output belongs to the class labeled as coherent, whereas, if a<0, the output belongs to the thermal class. Importantly, these two classes are a consequence of adjusting the weights defining the hyper-plane equation given by z=0 (also called decision surface), due to that the hyper plane divides into two regions the feature space. Thus, each possible input is assigned to one of the two regions. In the training stage, the weights are initially set to random values. After each observation (input), they are updated following a learning rule referred to as the delta rule given by equation (2):

$$\omega_i(k+1)=\omega_i(k)+\eta E(k)x_i(k) \qquad (2)$$

where k is a particular observation and i is a constant known as the learning rate. E(k) is the resulting error between the target output and neuron's output at k-th observation. Equation (2) can be derived of the gradient descent method taking as a cost function the mean squared error.

Accordingly, an embodiment of the current invention is directed to a method for identification of light source types. The method includes detecting individual photons for a measurement time period to provide a times series of individual photon events. The method further includes segmenting the time series into a plurality of time bins, and determining a number of detected photons within each time bin of the plurality of time bins to provide a time series of photon counts per time bin. The method also includes determining a probability distribution P(n) from the time series of photon counts per time bin, where the probability distribution provides the probability of detection of n photons (n=0, 1, 2, . . . , $n_{max}$), inputting each of the values of P(n) as a $n_{max}$+1 component feature vector into a single neuron neural network, the single neuron neural network having been previously trained on a plurality of light source types, and receiving as output a classifier that has a value that identifies the light source type. The average number of photons in the plurality of time bins can be less than one photon.

In some embodiments, the light source type is one of a coherent light source or a thermal light source. In some embodiments, $n_{max}$ is equal to 6 and the feature vector is a seven-component feature vector. In some embodiments, the single neuron neural network includes an identity activation function and a binary classification given by a threshold function to indicate a class labeled as coherent on a first side of a threshold or a class labeled thermal on a second side of the threshold.

In some embodiments, the plurality of time bins is less than 100. In some embodiments, the plurality of time bins is less than 20. In some embodiments, the plurality of time bins each have substantially equal temporal widths and have a value selected to correspond to a coherence time of the coherent light source. In some embodiments, the method further includes training the single neuron neural network prior to the identifying the light source type.

A light detection system for detecting light from a classified type of light source according to an embodiment of the current invention includes a light detector and a processing system that is configured to communicate with the light detector to receive signals to be processed. The processing system is constructed to perform any one of the above-noted methods according to embodiments of the current invention.

Another embodiment of the current invention is directed to a new family of quantum cameras or imaging systems endowed with the capability of identifying sources of light at each pixel. This technology can have enormous implications for microscopy, remote sensing, and astronomy. Embodiments of a smart quantum detector that enable the identification of light sources at the single-photon level are described above. This can be used to exploit quantum fluctuations of photons and the self-learning features of artificial neurons to dramatically reduce the number of measurements required to classify sources of light. Some embodiments demonstrated the identification of light sources with only tens of measurements at mean-photon numbers below one. This achievement represented a dramatic reduction in the number of photons and measurements of several orders of magnitude with respect to conventional schemes for quantum state characterization. Additional embodiments include smart quantum cameras, for example. These cameras can rely on the technology described above and in the following references, which are incorporated herein by reference. This is a novel quantum technology and the first demonstration of a smart quantum camera can dramatically change current technologies for remote sensing and object tracking.

Figure 2:
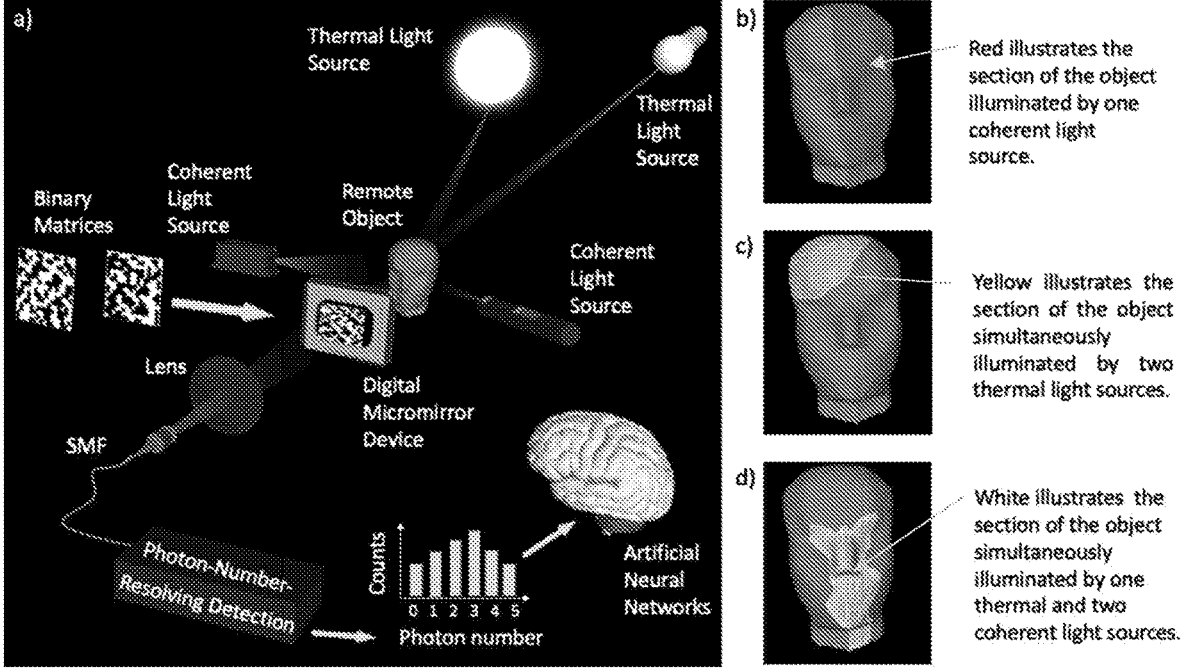
FIG. 2 is a schematic diagram of a smart quantum camera for remote sensing, according to an embodiment of the present invention.

FIG. 2 is a schematic diagram of a smart quantum camera for remote sensing, according to an embodiment of the present invention. FIG. 2 shows, in a), a smart single-pixel camera with photon-number resolution enables the identification of the light sources illuminating an arbitrary object. As shown in FIG. 2, light reflected from an object will be projected onto a digital micromirror device (DMD) where a series of binary patterns will be displayed. The light from the DMD will be collected by a single-mode fiber and then sent to a photon-number-resolving detector that will measure its statistical fluctuations. These underlying quantum fluctuations of photons will be identified by artificial neural networks, thus enabling a fast image reconstruction for specific light sources, as illustrated in b)-d). It is noted that the projection of light onto random matrices in the DMD will allow for artificial-intelligence-assisted compressive single-pixel cameras with photon-number resolution. These cameras will allow the formation of images as those shown in b)-d). The image in b) shows a red section (indicated by an arrow) that illustrates a section of the object illuminated by one coherent light source. The image in c) shows a yellow section (indicated by an arrow) that illustrates the section of the object simultaneously illuminated by two thermal light sources. The image in d) shows a white section (indicated by an arrow) that illustrates the section of the object simultaneously illuminated by one thermal and two coherent light sources. This technology requires novel theoretical models for the quantum fluctuations of light, the design of optimal convolutional neural networks, and the implementation of efficient single-pixel cameras with photon-number-resolving capabilities. The smart quantum cameras according to some embodiments of the current invention can have functionalities as those described in FIG. 2. The smart cameras can rely on novel models to describe characteristic photon statistics produced by the scattering of photons from multiple light sources (e.g., coherent light sources and/or thermal light sources).

An accurate description of these fundamental effects enables the design and implementation of artificial neural networks for classification and discrimination of light sources in realistic scenarios. Seminal research in this direction and demonstrated the engineering of quantum fluctuations of multiphoton systems is described. The experimental demonstration of a new generation of artificial neural networks can enable the generalization of smart single-pixel quantum detectors to a smart multi-pixel quantum camera with photon-number resolution according to an embodiment of this invention.

Accordingly, an optical imaging system for forming images from a classified type of light source according to another embodiment of the current invention includes a plurality of light detectors arranged in a patterned array; and a processing system configured to communicate with the plurality light detectors to receive signals to be processed to provide an image from the classified type of light source. The processing system is constructed to perform the method of any embodiment of the current invention for each of the plurality light detectors.

Figure 3:
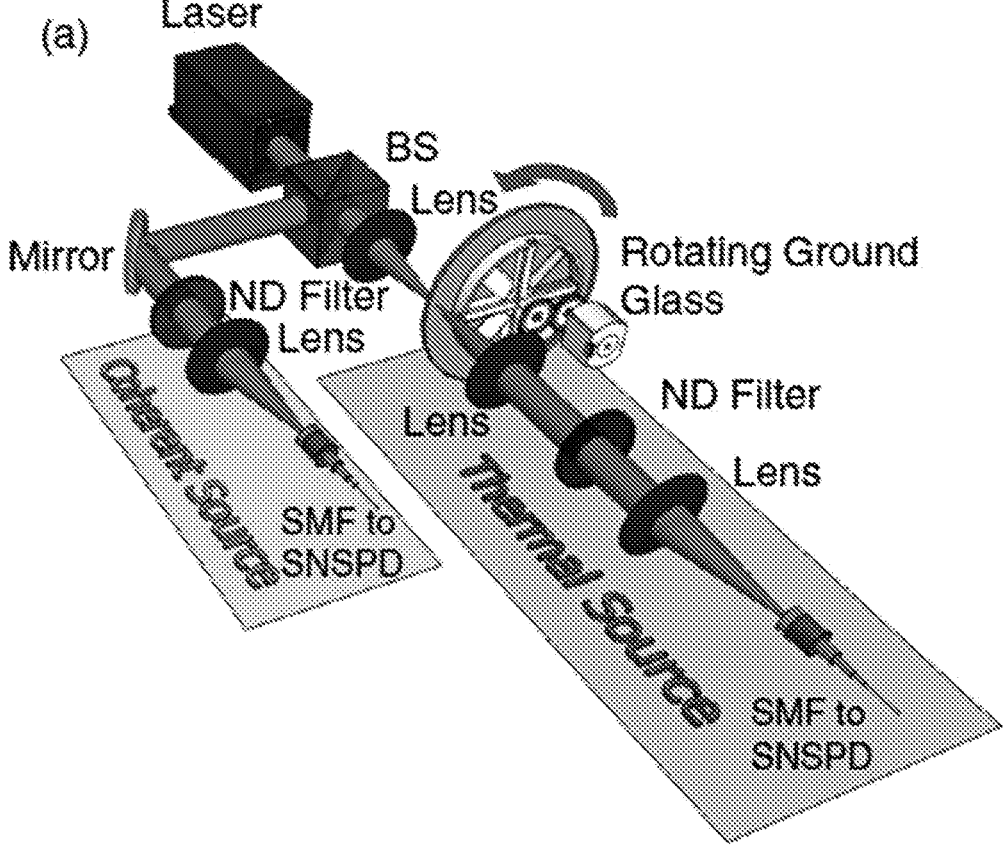
FIG. 3 is a schematic representation of an experimental apparatus for using coherent beam of light and thermal beam of light, according to an embodiment of the present invention.

The imaging system and method will be described further in detail in the following paragraphs. FIG. 3 is a schematic representation of an experimental apparatus for using coherent beam of light and thermal beam of light, according to an embodiment of the present invention. The apparatus includes using a continuous-wave (CW) laser beam that is divided by a 50:50 beam splitter. The transmitted beam is focused onto a rotating ground glass, which is used to generate pseudo-thermal light with super-Poissonian statistics. The beam emerging from the ground glass is collimated using a lens and attenuated by neutral-density (ND) filters to mean photon numbers below one. The attenuated beam is then coupled into a single-mode fiber (SMF). The fiber directs photons to a superconducting nanowire single-photon detector (SNSPD). Furthermore, the beam reflected by the beam splitter is used as a source of coherent light. This beam, characterized by Poissonian statistics, is also attenuated, coupled into a SMF and detected by another SNSPD. The SNSPDs' bias voltages are set to achieve high-efficiency photon counting with less than five dark counts per second. The mean photon number of the coherent beam is matched to that of the pseudo-thermal beam of light. In order to perform photon counting with our SNSPDs, we use the surjective photon counting method. In this case, the transistor-transistor logic (TTL) pulses produced by the SNSPDs were detected and recorded by an oscilloscope. The data were divided in time bins of 1 ls, which corresponds to the coherence time of the CW laser. Moreover, the 20 ns recovery time of our SNSPDs ensured that we perform measurements on a single-temporal-mode field. Voltage peaks above ~0.5 V were considered as one photon event. The number of photons (voltage peaks) in each time bin was counted to retrieve photon statistics. These events were then used for training and testing the present ADALINE neuron and naive Bayes classifier.

The probability of finding n photons in coherent light is given by $$P_{coh}(n) = e^{-\bar{n}}\left(\frac{n^n}{n!}\right),$$

where $\bar{n}$ denotes the mean photon number of the beam. Furthermore, the photon statistics of thermal light is given by $P_{th}(n) = \bar{n}^n(\bar{n}+1)^{n+1}$. It is worth noting that the photon statistics of thermal light is characterized by random intensity fluctuations with a variance greater than the mean number of photons in the mode. For coherent light, the maximum photon-number probability sits around $\bar{n}$. For thermal light, the maximum is always at vacuum. However, when the mean photon number is low, the photon number distribution for both kinds of light becomes similar. Consequently, it becomes extremely difficult to discriminate one source from the other source. The conventional approach to discriminate light sources makes use of histograms generated through the collection of millions of measurements. Unfortunately, this method is not only time consuming, but also imposes practical limitations.

In order to dramatically reduce the number of measurements required to identify light sources, we make use of an ADALINE neuron. ADALINE is a single neural network model based on a linear processing element, proposed initially by Bernard Widrow, for binary classification. In general, the neural networks undergo two stages: training and test. In the training stage, ADALINE is capable of learning the correct outputs (named as output labels or classes) from a set of inputs, so-called features, by using a supervised learning algorithm. In the test stage, the ADALINE neuron produces the outputs of a set of inputs that were not in the training data, taking as reference the acquired experience in the training stage. Although we tested architectures far more complex than a single neuron for the identification of light sources, we found that a simple ADALINE offers a perfect balance between accuracy and simplicity. The structure of the ADALINE model is shown in FIG. 1. The neuron input features are denoted by P(n), which corresponds to the probability of detecting n photons, in a single measurement event, for a given light source, namely coherent or thermal. Furthermore, the parameters co, are the synaptic weights and b is a bias term. In the training period, these parameters are optimized through the learning rule by using the error between the target output and neuron's output as reference. For the binary classification (coherent or thermal), the neuron's output is fed into the identity activation function, and subsequently to the threshold function.

To train the ADALINE, we make use of the so-called delta learning rule, in combination with a database of experimentally measured photon-number distributions, considering different mean photon numbers: $\bar{n}$=0.44, 0.53, 0.67, 0.77. The database for each mean photon number was divided into subsets comprising 10, 20, . . . , 150, 160 data points. The ADALINE neurons are thus prepared by using one thousand of those subsets, where 70% are devoted to training and 30% to testing. In all cases, the training was stopped after 50 epochs.

We have established the baseline performance for our ADALINE neuron by using naive Bayes classifier. This is a simple classifier based on Bayes' theorem. Throughout this article, we assume that each measurement is independent. Moreover, we represent the measurement of the photon number sequence as a vector $x=(x_1, \ldots, x_k)$. Then, the probability of this sequence generated from coherent or thermal light is given by p $(C_j|x_1, \ldots, x_k)$ where $C_j$ could denote either coherent or thermal light. Using Bayes' theorem, the conditional probability can be decomposed as $$p(C_j|x) = \frac{p(c_j)p(x|C_j)}{p(x)}.$$

By using the chain rule for conditional probability, we have $$p(C_k|x_1, \ldots, x_k) = p(C_j) \prod_{i=1}^{k} p(x_i|C_j).$$

Since our light source is either coherent or thermal, we assume $p(C_j)=0.5$. Thus, it is easy to construct a naive Bayes classifier, where one picks the hypothesis with the highest conditional probability $p(C_j|x)$. We used theoretically generated photon-number probability distributions as the prior probability $p(x_i|C_j)$, and used the experimental data as the test data.

Figures 4A, 4B, 4C, 4D:
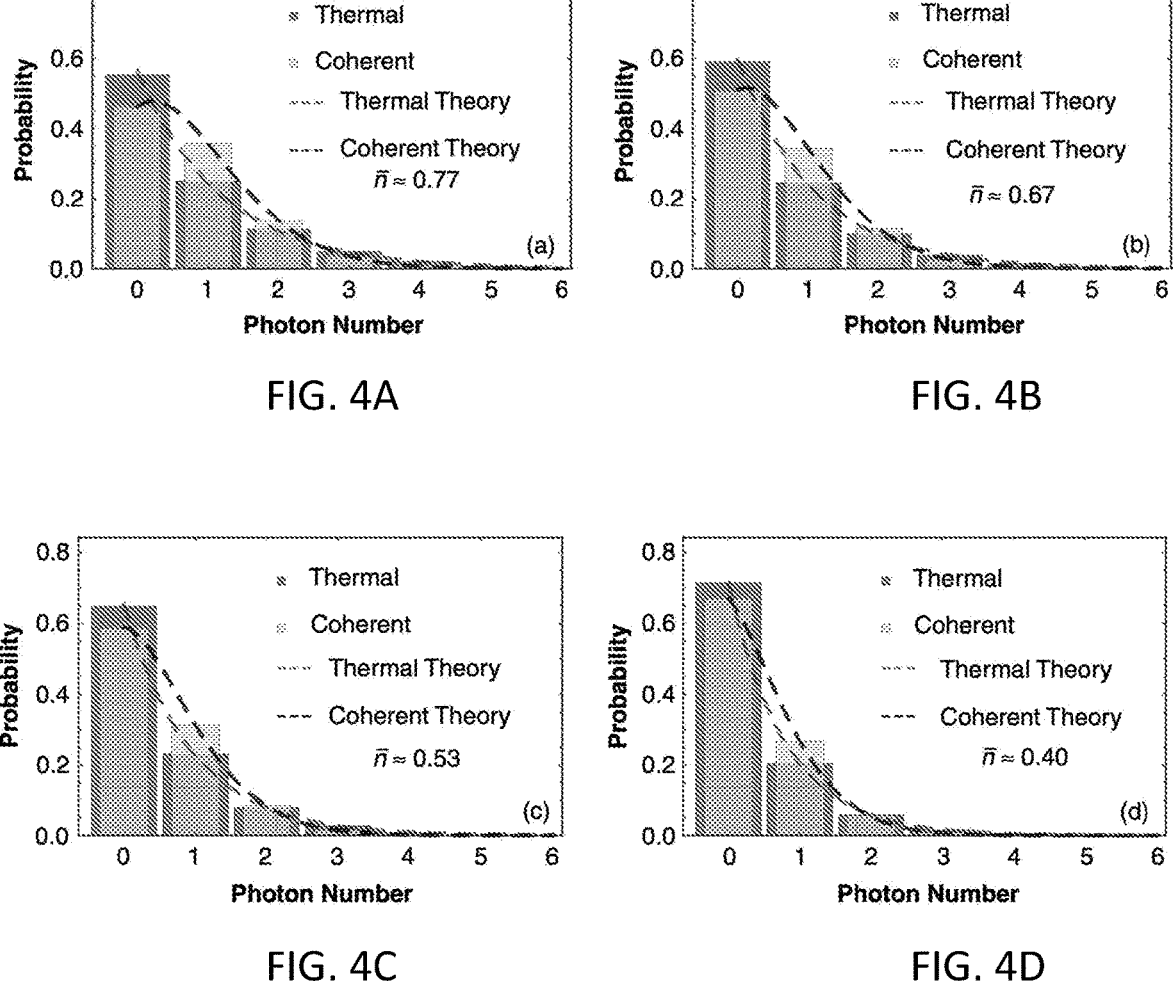
FIGS. 4A-4D shows a set of histograms displaying theoretical and experimental photon number probability distributions for coherent and thermal light beams with different mean photon numbers, according to an embodiment of the present invention.

FIGS. 4A-4D shows a set of histograms displaying theoretical and experimental photon number probability distributions for coherent and thermal light beams with different mean photon numbers, according to an embodiment of the present invention. These histograms show that our experimental results are in excellent agreement with theory. The photon number distributions illustrate the difficulty in discriminating light sources at low-light levels even when large sets of data are available. In FIGS. 4A-4D, we compare the histograms for the theoretical and experimental photon number distributions for different mean photon numbers $\bar{n}=0.40$, 0.53, 0.67 and 0.77. The bar plots are generated by experimental data with one million measurements for each source. The curves in each of the panels represent the expected theoretical photon number distributions for the corresponding mean photon numbers. FIGS. 4A-4D show excellent agreement between theory and experiment which demonstrates the accuracy of our surjective photon counting method. Furthermore, we can also observe the effect of the mean photon number on the photon number probability distributions. As shown in FIG. 4A, it is evident that millions of measurements enable one to discriminate light sources. On the other hand, FIG. 4D shows a situation in which the source mean-photon number is low. In this case, the discrimination of light sources becomes cumbersome, even with millions of measurements. In order to illustrate the difficulty of using limited sets of data to discriminate light sources at low mean photon numbers, we restrict the size of our dataset to 10, 20, 50, 100 and 100000.

Figure 5A:
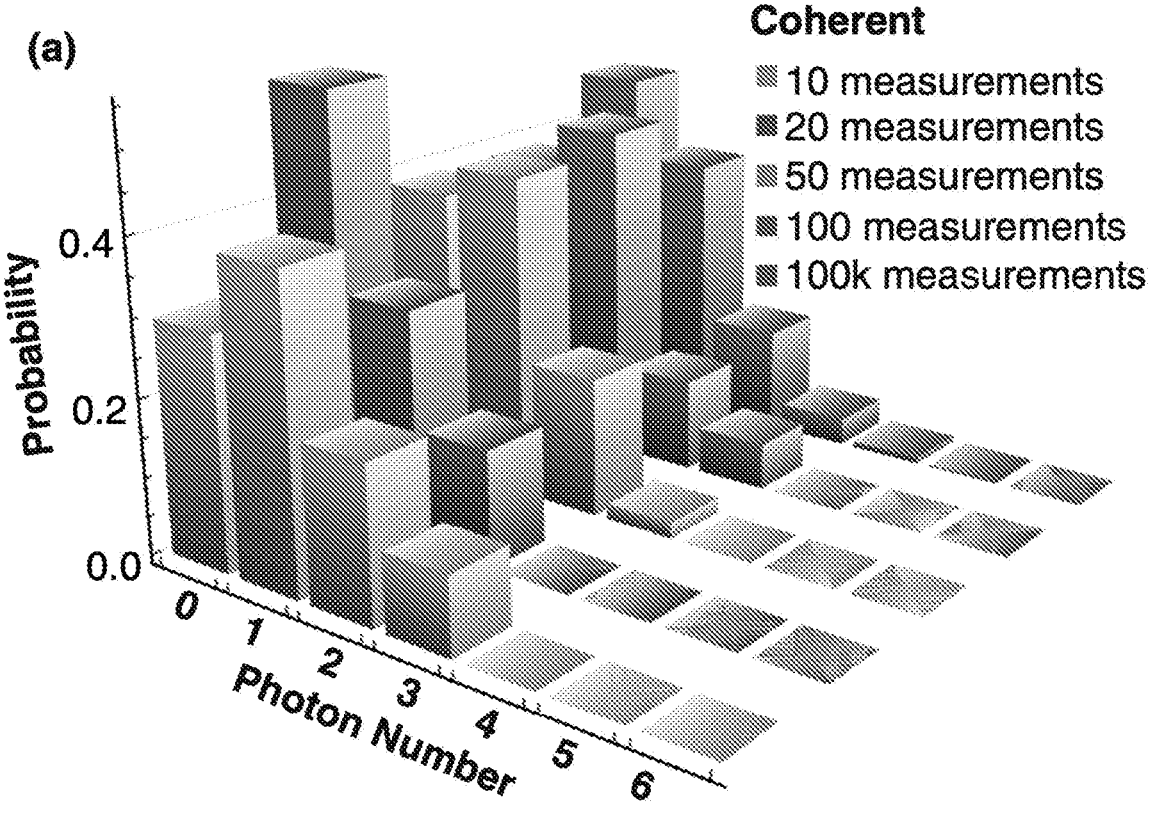
FIGS. 5A-5B show the probability distributions of coherent and thermal light, for varying dataset sizes (10, 20, 50, 100, 10 k), according to an embodiment of the present invention.
Figure 5B:
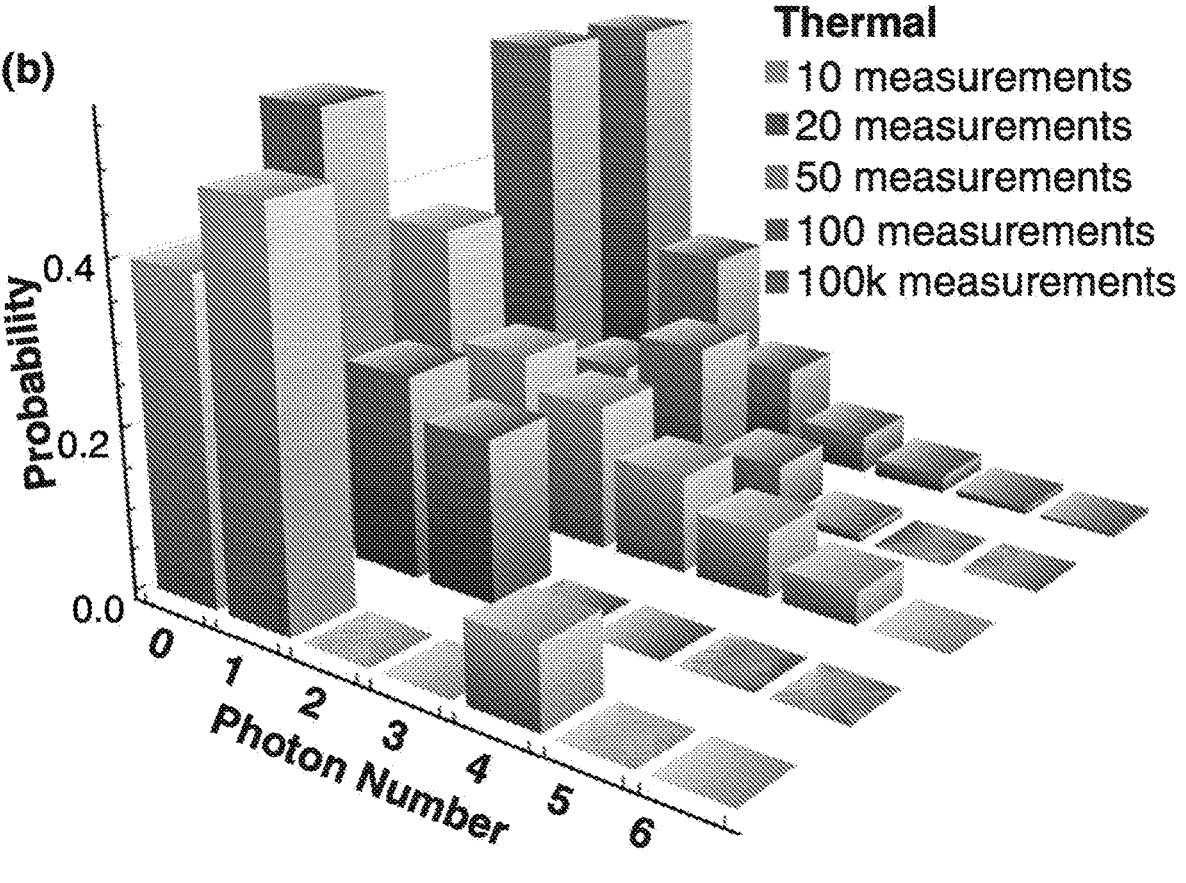

FIGS. 5A-5B show the probability distributions of coherent and thermal light, for varying dataset sizes (10, 20, 50, 100, 10 k), according to an embodiment of the present invention. Data used here is randomly selected from of the measurement presented in FIG. 4A. As shown in FIGS. 5A-5B, the photon number distributions obtained with limited number of measurements do not resemble those in the histograms shown in FIG. 4A, for both coherent and thermal light beams.

Figure 6:
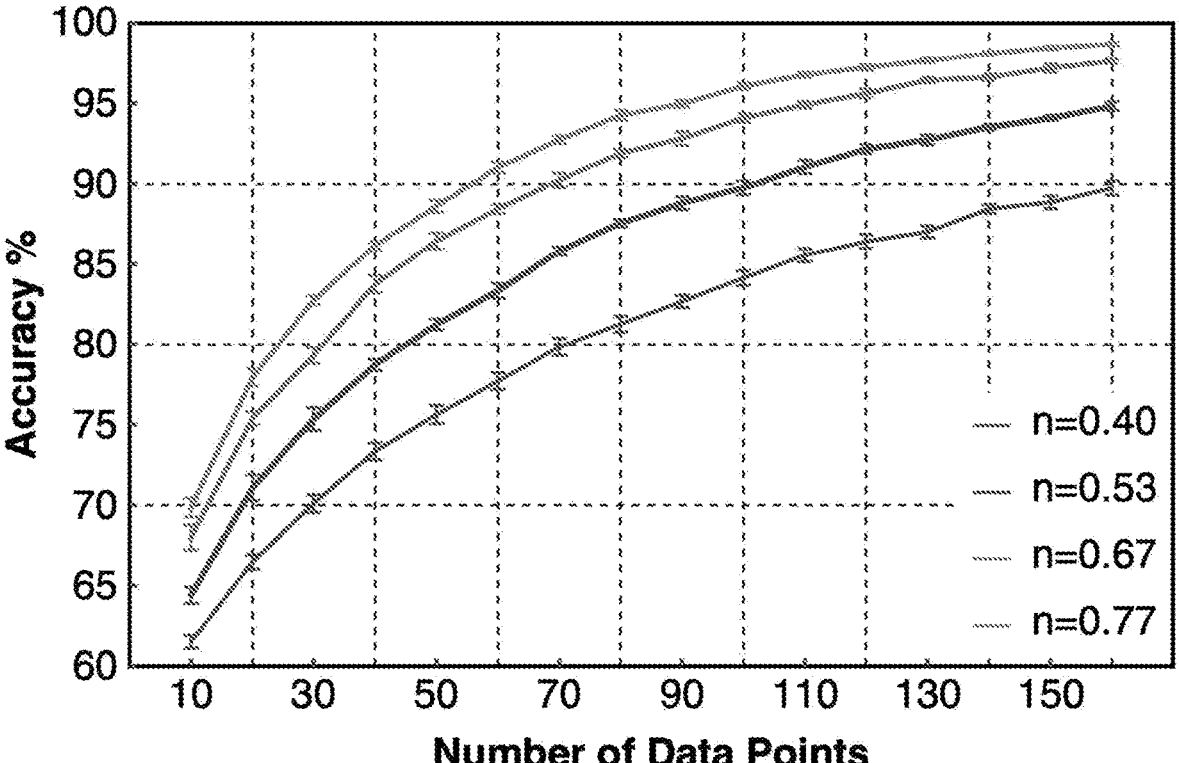
FIG. 6 is a plot of the overall accuracy of light discrimination versus the number of data points used in naive Bayes classifier.

FIG. 6 is a plot of the overall accuracy of light discrimination versus the number of data points used in naive Bayes classifier. In FIG. 6, the curves represent the accuracy of light discrimination for $\bar{n}=0.40$ (red line), $\bar{n}=0.53$ (blue line), $\bar{n}=0.67$ (green line) and $\bar{n}=0.77$ (orange line). The error bars are generated by dividing the data into ten subsets. For example, when $\bar{n}=0.40$, the accuracy of discrimination increases from approximately 61% to 90% as we increase the number of data points from 10 to 160. It is worth noting that even with small increase in number of measurements, the naive Bayes classifier starts to capture the characteristic feature of different light sources, given by distinct sequences of photon number events. This can be understood as larger sets of data contain more information pertaining to the probability distribution. Furthermore, mean photon number of the light field significantly changes the discrimination accuracy profile. As the mean photon number increases, the overall accuracy converges faster towards 100% as expected. This is due to the fact that the photon number probability distributions become more distinct at higher mean photon number.

Figure 7:
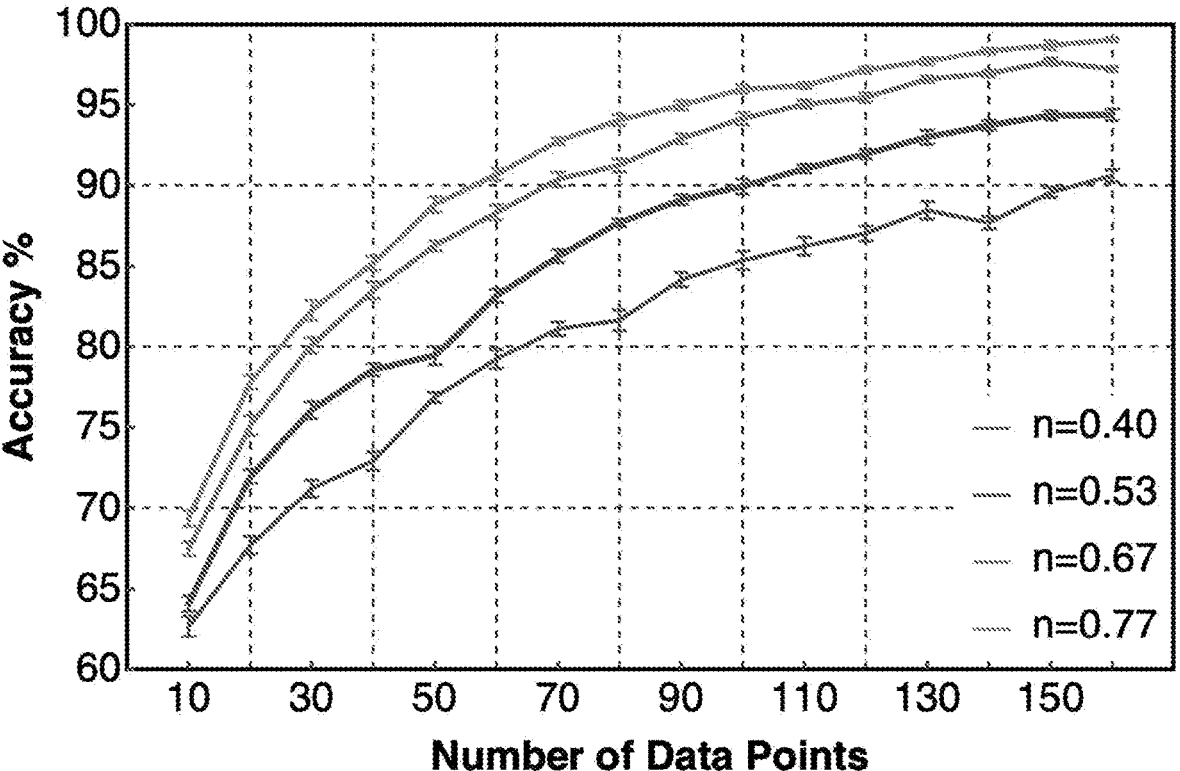
FIG. 7 is a plot of the overall accuracy of light discrimination versus the number of data points used in ADALINE, according to an embodiment of the present invention.

FIG. 7 is a plot of the overall accuracy of light discrimination versus the number of data points used in ADALINE, according to an embodiment of the present invention. The curves represent the accuracy of light discrimination for $\bar{n}=0.40$ (red line), $\bar{n}=0.53$ (blue line), $\bar{n}=0.67$ (green line) and $\bar{n}=0.77$ (orange line). The error bars represent the standard deviation of the training stages. Using only 10 data points, ADALINE leads to an average accuracy between 61%-65% for $\bar{n}=0.40$; whereas for 160 data points, the accuracy is greater than 90%. The comparison of FIG. 6 and FIG. 7 reveals that ADALINE and naive Bayes classifier exhibit similar accuracy levels. However, ADALINE requires far less computational resources than naive Bayes classifier. As one might expect, in both cases, the accuracy increases with the number of data points and mean photon numbers. Interestingly, the convergence rate for naive Bayes is slightly higher than that of ADALINE classifier. For low mean photon numbers, such as $\bar{n}=0.40$, the improvement in accuracy scales linearly for naive Bayes classifier, as opposed to almost logistic growth that has our ADALINE. This implies that at low mean photon numbers ADALINEs outperform naive Bayes classifier in the sense that the ADALINE uses much less computational resources than the Bayes classifier.

Figures 8A, 8B, 8C, 8D:
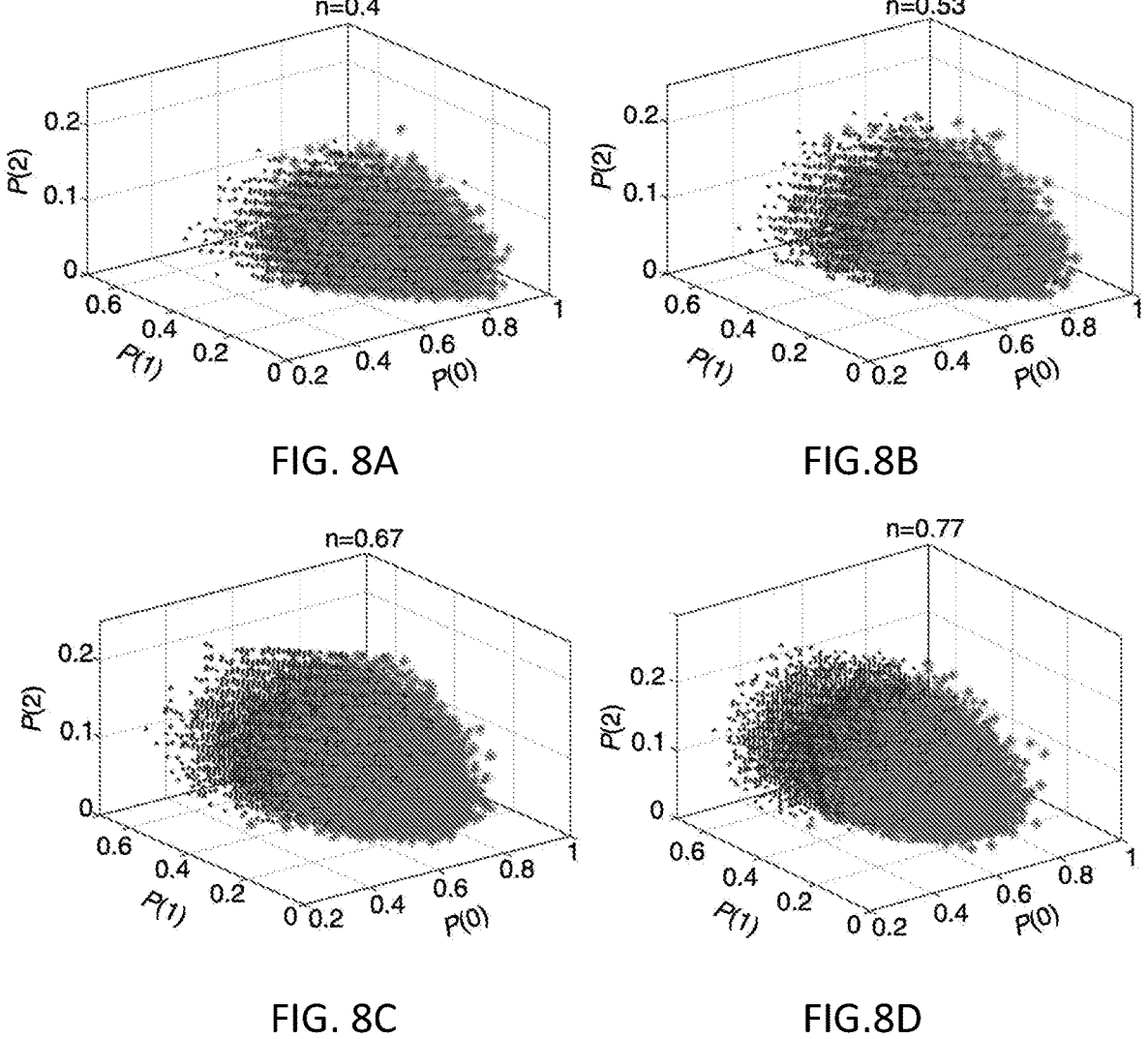
FIGS. 8A-8D show a 3-dimensional (3D) projection of the feature space on the plane (P(0), P(1), P(2)) for different mean photon numbers, according to an embodiment of the present invention.

FIGS. 8A-8D show a 3-dimensional (3D) projection of the feature space on the plane (P(0), P(1), P(2)) for different mean photon numbers, according to an embodiment of the present invention. FIG. 8A shows a 3D projection for a number of photons (a) $\bar{n}=0.4$. FIG. 8B shows a 3D projection for a number of photons (b) $\bar{n}=0.53$. FIG. 8C shows a 3D projection for a number of photons (c) $\bar{n}=0.67$. FIG. 8D shows a 3D projection for a number of photons (d) $\bar{n}=0.77$. The blue points correspond to photon statistics of coherent light, whereas the red stars describe photon statistics of thermal light. In all cases the number of data points is fixed at M=60.

To understand why a single ADALINE neuron is enough for light discrimination, we first realize that ADALINE is a linear classifier. Therefore, the decision surface is expressed by a seven-dimensional hyper-plane, defined by the seven P(n) (with n=0, 1, ..., 6) features. Interestingly, one can find that the datasets at the space of probability-distribution values are linearly separable. This can be seen from FIGS. 8A-8D, where we plot the projection of the feature space on a three-dimensional sub-space defined by (P(0), P(1), P(2)) considering different mean photon numbers $\bar{n}=0.4$, 0.53, 0.67 and 0.77 (the number of data points is fixed at M=60 in all cases). Within this subspace, the datasets corresponding to the photon statistics of thermal (red stars) and coherent (blue points) lights separate each other as $\bar{n}$ increases. This effect is more evident when the number of data points is increased, and the mean photon number remains fixed at $\bar{n}=0.77$ (see, FIGS. 9A-9D). Evidently, the fact that both, thermal and coherent light form two well linearly separated classes makes ADALINE the optimum classifier for light identification.

Figures 9A, 9B:
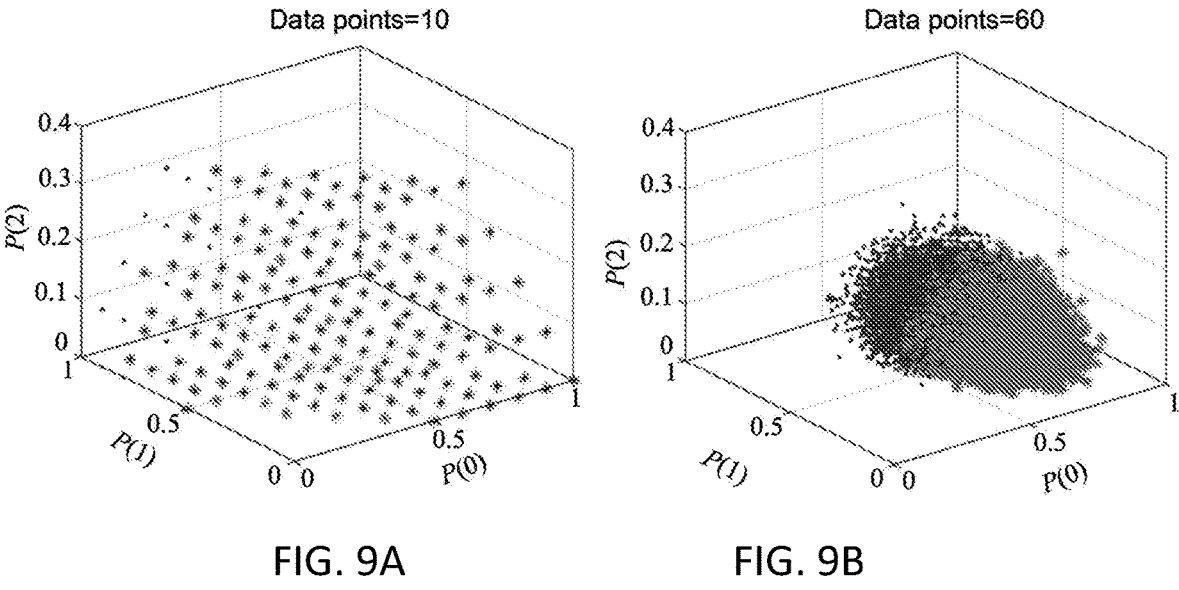
FIGS. 9A-9D shows 3D Projection of the feature space on the plane (P(0), P(1), P(2)) for different number of data points, according to an embodiment of the present invention.
Figures 9C, 9D:
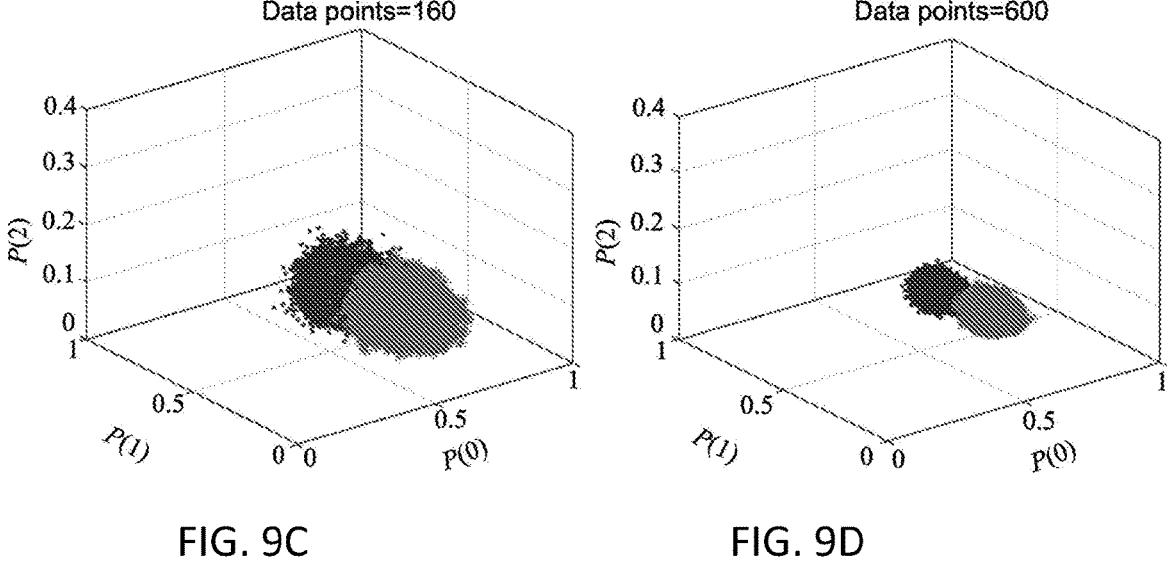

FIGS. 9A-9D shows 3D Projection of the feature space on the plane (P(0), P(1), P(2)) for different number of data points, according to an embodiment of the present invention. FIG. 9A shows a 3D projection using 10 data points. FIG. 9B shows a 3D projection using 60 data points. FIG. 9C shows a 3D projection using 160 data points. FIG. 9D shows a 3D projection using 600 data points. The blue points correspond to photon statistics of coherent light, whereas the red stars describe photon statistics of thermal light. In all cases, the mean photon number is set to $\bar{n}=0.77$.

In embodiments of the present invention, we evaluate two additional machine-learning (ML) algorithms, namely a one-dimensional convolutional neural network (1D CNN) and a multilayer neural network (MNN). Despite both algorithms are effective to identify light sources, they are analytically and computationally more sophisticated than the simple ADALINE model, but their recognition rates do not present substantial differences.

FIG. 10A is a schematic structure representation one-dimensional convolutional neural network 1D-CNN), according to an embodiment of the present invention. FIG. 10B is a schematic structure representation of a multilayer neural network (MNN) used for demonstration of light source identification, according to another embodiment of the present invention. A convolutional neural network (CNN) is a deep learning algorithm that extracts automatically relevant features of the input. The present one-dimensional convolutional neural network (1D-CNN) is composed by two 1D-convolutional layers that extract the low and high-level features of the input. Outcomes from these two layers are subsequently fed into a convolutional layer sandwiched between two max-pooling layers. The pooling layers downsample the input representation, and therefore its dimensionality, leading to a computational simplification by removing redundant and unnecessary information. The activation function, implemented in all layers, is the rectified linear unit function (ReLU). Finally, a fully connected and a flattening layer precedes the output layer consisting of two softmax functions, whose outputs are the probability distributions over labels.

On the other hand, the multilayer neural network (MNN) belongs to a classical machine learning algorithm, where the feature vector is manually determined. In the present case, this vector is given by the probabilities of the photon number distribution, P(n). As depicted in FIG. 10B, the model corresponds to a two-layer feed-forward network: the hidden layer contains ten sigmoid neurons and the output layer consists of a softmax function. To determine a suitable neuron number in the hidden layer of the MNN, we trained different MNNs by changing the neuron number in the hidden layer and followed the accuracy values for each net.

Figures 11A, 11B:
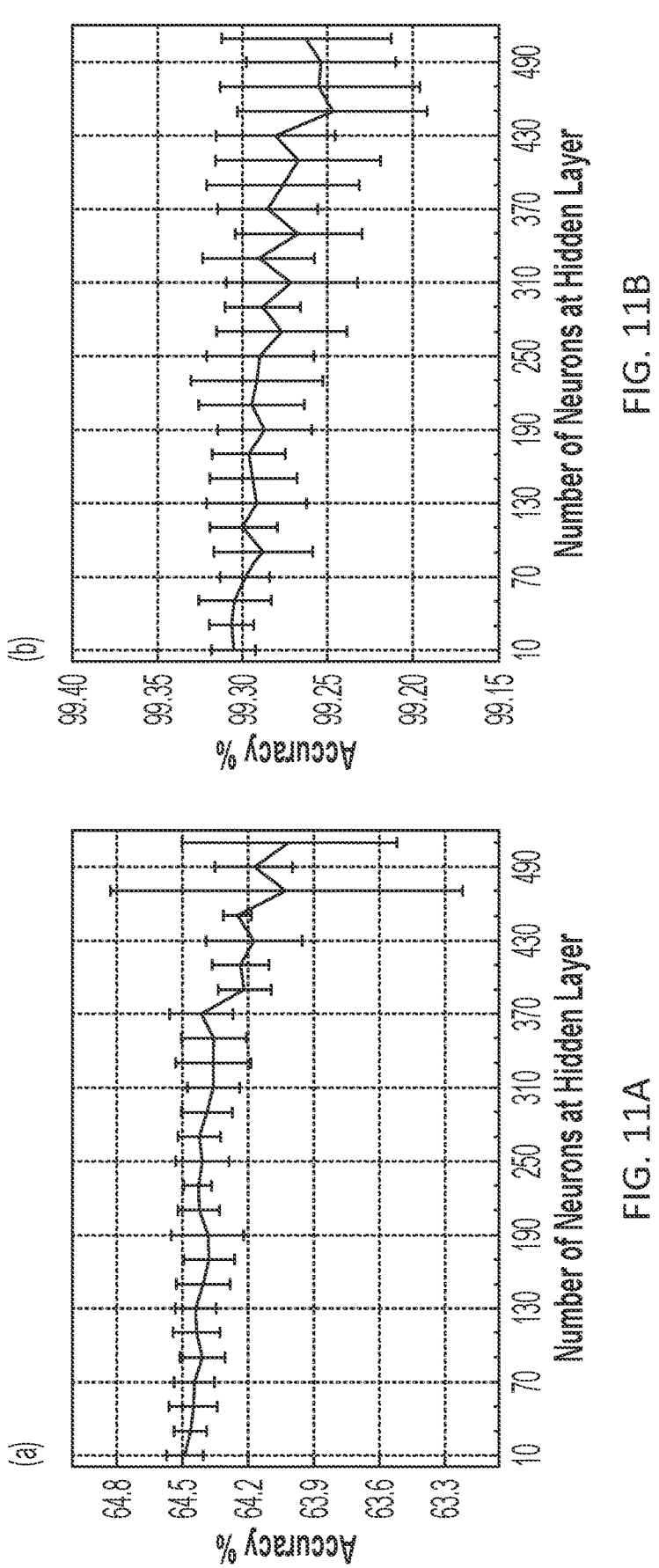
FIGS. 11A-11B are plots of the overall accuracy of light discrimination versus the number of neurons in the hidden layer of the MNN by considering two different mean photon numbers, according to an embodiment of the present invention.

FIGS. 11A-11B are plots of the overall accuracy of light discrimination versus the number of neurons in the hidden layer of the MNN by considering two different mean photon numbers, according to an embodiment of the present invention. FIG. 11A is a plot of the accuracy of light discrimination versus number of neurons for a mean photon number $\bar{n}=0.4$. FIG. 11B is a plot of the accuracy of light discrimination versus number of neurons for a mean photon number $\bar{n}=0.77$. The error bars represent the standard deviation of the training stages. Note that in both cases, the accuracy becomes lower as the number of neurons increases. This is because many neurons lead to over-parameterization, causing poor generalization of the test-stage data. Additionally, as the number of neurons increases, the training becomes computationally more intensive. All the MNNs were trained by using the scaled conjugate gradient backpropagation method where the cross-entropy was employed as the cost function. Since the output of sigmoid neurons is ranged in the interval [0,1], the cross-entropy function is ideal for the classification task. The network training was stopped after 200 epochs.

Figures 12A, 12B:
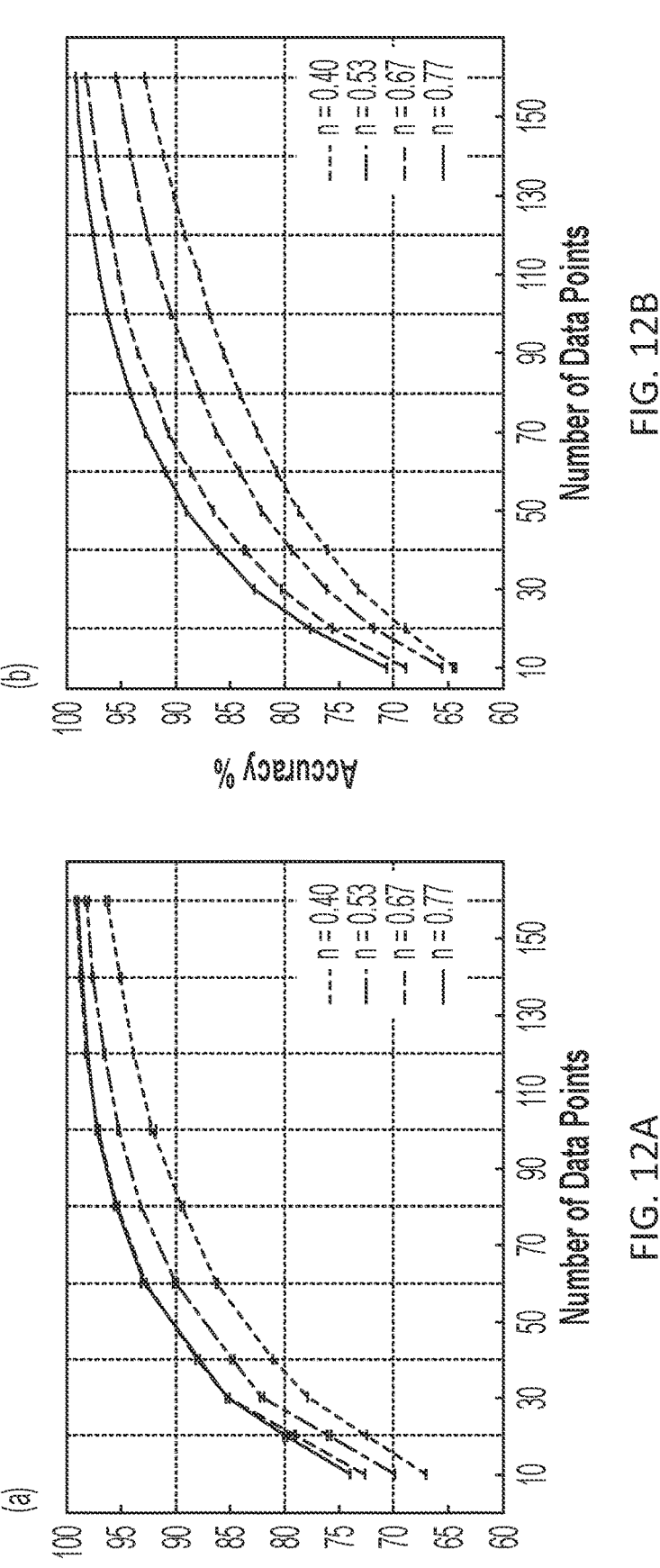
FIGS. 12A-12B are plots of the overall accuracy of light discrimination versus the number of data points, according an embodiment of the present invention.

FIGS. 12A-12B are plots of the overall accuracy of light discrimination versus the number of data points, according an embodiment of the present invention. FIG. 12A is a plot of the accuracy versus the number of points used in (a) 1D-CNN. FIG. 12B is a plot of the accuracy versus the number of points used in (b) MNN. The curves represent the accuracy of light discrimination for $\bar{n}=0.40$ (red line), $\bar{n}=0.53$ (blue line), $\bar{n}=0.67$ (green line) and $\bar{n}=0.77$ (orange line). The error bars represent the standard deviation of the training epochs for 1D-CNN and training stages for MNN.

Another aspect of the present invention is to improve or enhance the resolution of optical imaging systems. The spatial resolution of optical imaging systems is established by the diffraction of photons and the noise associated with their quantum fluctuations. For over a century, the Abbe-Rayleigh criterion has been used to assess the diffraction-limited resolution of optical instruments. At a more fundamental level, the ultimate resolution of optical instruments is established by the laws of quantum physics through the Heisenberg uncertainty principle. In classical optics, the Abbe-Rayleigh resolution criterion stipulates that an imaging system cannot resolve spatial features smaller than $\lambda/2NA$. In this case, X represents the wavelength of the illumination field, and NA describes numerical aperture of the optical instrument. Given the implications that overcoming the Abbe-Rayleigh resolution limit has for multiple applications, such as, microscopy, remote sensing, and astronomy, there has been an enormous interest in improving the spatial resolution of optical systems. Recently, optical super-resolution has been demonstrated through decomposition of spatial eigenmodes.

For almost a century, the importance of phase over amplitude information has constituted established knowledge for optical engineers. Recently, this idea has been extensively investigated in the context of quantum metrology. More specifically, it has been demonstrated that phase information can be used to surpass the Abbe-Rayleigh resolution limit for the spatial identification of light sources. For example, phase information can be obtained through mode decomposition by using projective measurements or demultiplexing of spatial modes. Naturally, these approaches require a priori information regarding the coherence properties of the, in principle, "unknown" light sources. Furthermore, these techniques impose stringent requirements on the alignment and centering conditions of imaging systems. Despite these limitations, most, if not all, the current experimental protocols have relied on spatial projections and demultiplexing in the Hermite-Gaussian, Laguerre-Gaussian, and parity basis.

The quantum statistical fluctuations of photons establish the nature of light sources. As such, these fundamental properties are not affected by the spatial resolution of an optical instrument. Here, we demonstrate that measurements of the quantum statistical properties of a light field enable imaging beyond the Abbe-Rayleigh resolution limit. This is performed by exploiting the self-learning features of artificial intelligence to identify the statistical fluctuations of photon mixtures. More specifically, we demonstrate a smart quantum camera with the capability to identify photon statistics at each pixel. For this purpose, we introduce a universal quantum model that describes the photon statistics produced by the scattering of an arbitrary number of light sources. This model is used to design and train artificial neural networks for the identification of light sources. Remarkably, our scheme enables us to overcome inherent limitations of existing super-resolution protocols based on spatial mode projections and multiplexing.

Figure 13A:
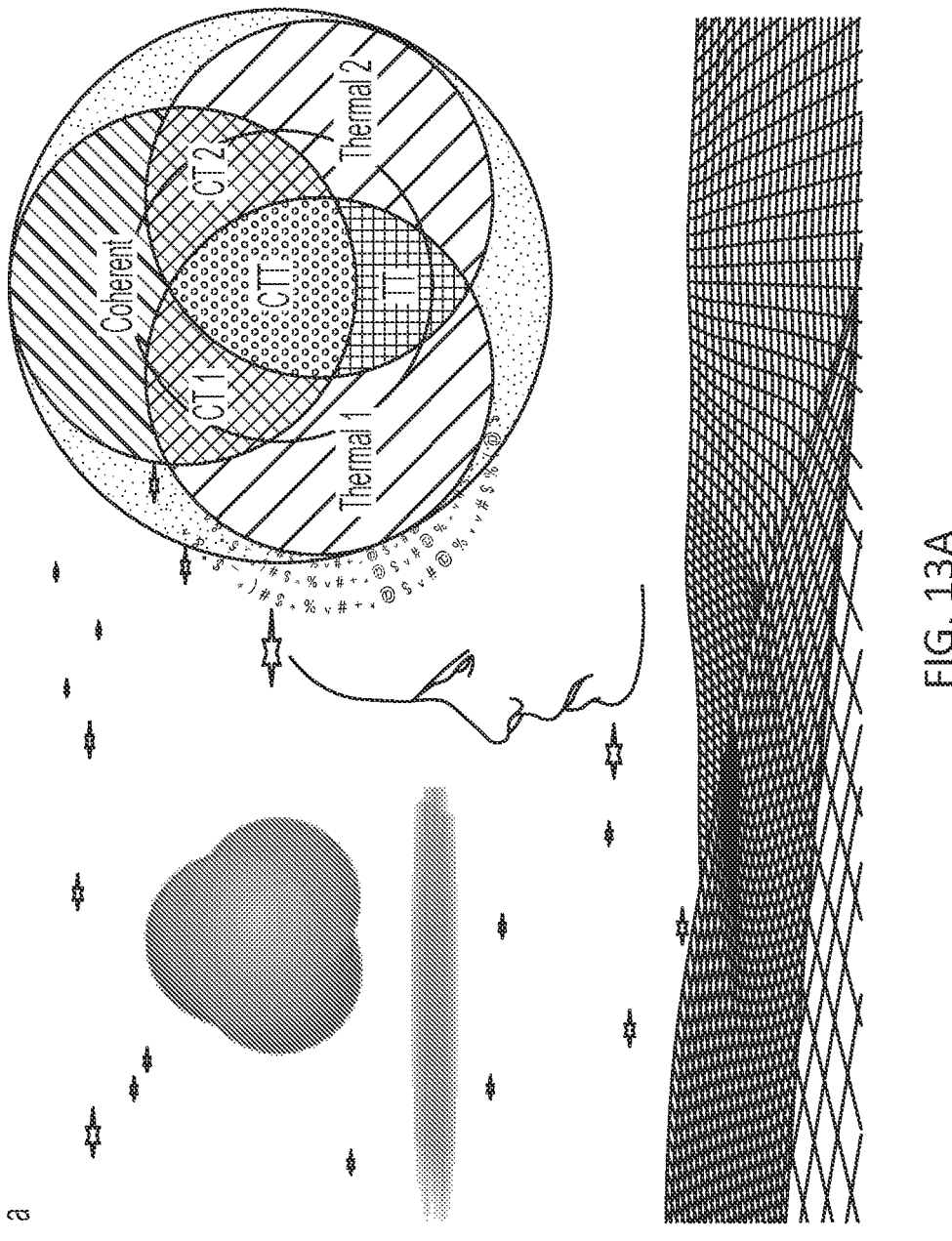
FIGS. 13A and 13B is a conceptual illustration and schematic of another experimental setup to demonstrate super-resolving imaging, according to an embodiment of the present invention.
Figure 13B:
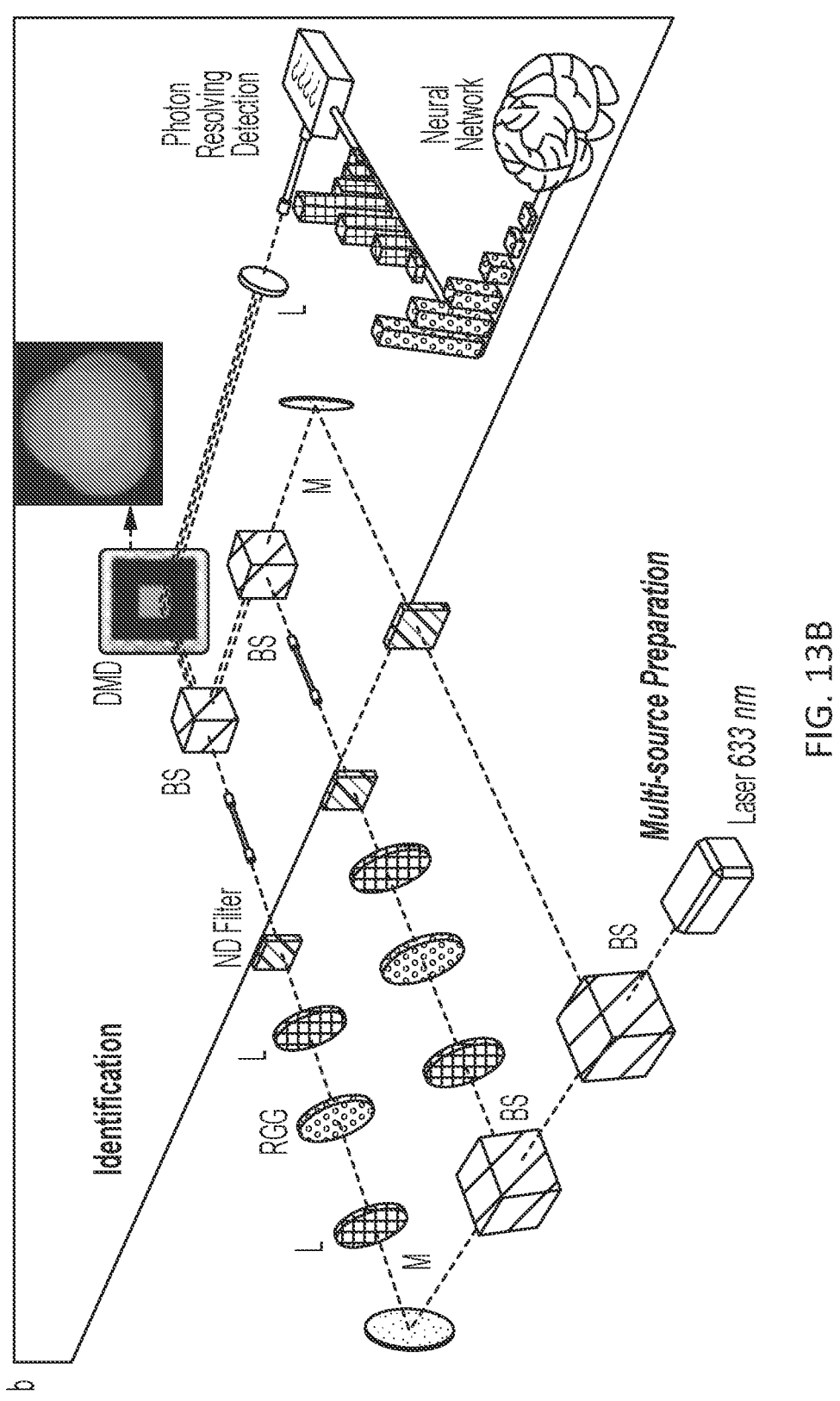

FIGS. 13A and 13B is a conceptual illustration and schematic of another experimental setup to demonstrate super-resolving imaging, according to an embodiment of the present invention. The illustration in FIG. 13A depicts a scenario where diffraction limits the resolution of an optical instrument for remote imaging. The present scheme is capable of identifying the corresponding photon fluctuations and their combinations, for example coherent-thermal (CT1, CT2), thermal-thermal (TT) and coherent-thermal-thermal (CTT). This capability allows to boost the spatial resolution of optical instruments beyond the Abbe-Rayleigh resolution limit. The experimental setup shown in FIG. 13B is designed to generate two independent thermal source and one coherent light source. The three sources are produced from a continuous-wave (CW) laser at 633 nm. The CW laser beam is divided by two beam splitters (BS) to generate three spatial modes, two of which are then passed through rotating ground glass (RGG) disks to produce two independent thermal light beams. The three light sources, with different photon statistics, are attenuated using neutral density (ND) filters and then combined to mimic a remote object such as the one shown in the inset of FIG. 13B. This setup enables the generation of multiple sources with tunable statistical properties. The generated target beam is then imaged onto a digital micro-mirror device (DMD) that can be used to perform raster scanning. The photons reflected off the DMD are collected and measured by a single-photon detector. The present protocol is formalized by performing photon-number-resolving detection.

The schematic behind the experiment is depicted in FIGS. 13A and 13B. This camera utilizes an artificial neural network to identify the photon statistics of each point source that constitutes a target object. The description of the photon statistics produced by the scattering of an arbitrary number of light sources is achieved through a general model that relies on the quantum theory of optical coherence. We use this model to design and train a neural network capable of identifying light sources at each pixel of our camera. This is achieved by performing photo-number-resolving detection. The sensitivity of the present camera is limited by the photon fluctuations of the detected field.

In general, realistic imaging instruments deal with the detection of multiple light sources. These sources can be either distinguishable or indistinguishable. The combination of indistinguishable sources can be represented by either coherent or incoherent superpositions of light sources characterized by Poissonian (coherent) or super-Poissonian (thermal) statistics. In our model, we first consider the indistinguishable detection of N coherent and M thermal sources. For this purpose, we make use of the P-function $P_{coh}(\gamma) = \delta^2(\gamma - \alpha_k)$ to model the contributions from the kth coherent source with the corresponding complex amplitude $\alpha_k$. The total complex amplitude associated to the superposition of an arbitrary number of light sources is given by $$\alpha_{tot} = \sum\nolimits_{k=1}^{N} a_k.$$

In addition the P-function for the lth thermal source, with the corresponding mean photon numbers $\overline{m}_l$, is defined as $P_{th}(\gamma) = (\pi \overline{m}_l)^{-1} \exp(-|\gamma|^2/\overline{m}_l)$. The total number of photons attributed to the M number of thermal sources is defined as $$m_{tot} = \sum\nolimits_{l=1}^{M} \overline{m}_l.$$

These quantities allow us to calculate the P-function for the multisource system as equation (3).

$$P_{th-coh}(\gamma) = \tag{3}$$

$$\int \cdots \int P_{N+M}(\gamma - \gamma_{N+M-1}) \times \left[ \prod_{i=2}^{N+M-1} P_i(\gamma_i - \gamma_{i-1}) d^2\gamma_i \right] P_1(\gamma_1) d^2\gamma_1$$

This approach enables the analytical description of the photon-number distribution $p_{th-coh}(n)$ associated to the detection of an arbitrary number of indistinguishable light sources. This is calculated as $p_{th-coh}(n) = \langle n | \hat{\rho}_{th-coh} | n \rangle$, where $p_{th-coh} = \int P_{th-coh}(\gamma) | \gamma \rangle \langle \gamma | d^2\gamma$. After algebraic manipulation, we obtain the following photon-number distribution (4).

$$\tag{4}$$

$$p_{th-coh}(n) =$$

$$\frac{(m_{tot})^n \exp\left(-\frac{(|\alpha_{tot}|)^2}{m_{tot}}\right)}{\pi (m_{tot}+1)^{n+1}} \times \sum_{k=0}^{n} \frac{1}{k!\,(n-k)!} \Gamma\left(\frac{1}{2}+n-k\right) \Gamma\left(\frac{1}{2}+k\right) \times$$

$$_1F_1\left(\frac{1}{2}+n-k;\frac{1}{2};\frac{(\mathrm{Re}\,[\alpha_{tot}])^2}{m_{tot}(m_{tot}+1)}\right) {}_1F_1\left(\frac{1}{2}+k;\frac{1}{2};\frac{(\mathrm{Im}\,[\alpha_{tot}])^2}{m_{tot}(m_{tot}+1)}\right)$$

where $\Gamma(z)$ and $_1F_1(a; b; z)$ are the Euler gamma and the Kummer confluent hypergeometric functions, respectively. This probability function enables the general description of the photon statistics produced by any indistinguishable combination of light sources. Thus, the photon distribution produced by the distinguishable detection of N light sources can be simply obtained by performing a discrete convolution of equation (4) as following equation (5).

$$\tag{5}$$

$$p_{tot}(n) =$$

$$\sum_{m_1=0}^{n} \sum_{m_2=0}^{n-m_1} \cdots \sum_{m_{N-1}=0}^{m-\sum_{j=1}^{N-1} m_j} p_1(m_1) p_2(m_2) \ldots p_{N-1}(m_{N-1}) p_N\left(n - \sum_{j=1}^{n-1} m_j\right).$$

The combination of equation (4) and equation (5) allows the classification of photon-number distributions for any combination of light sources.

Figures 14A, 14B:
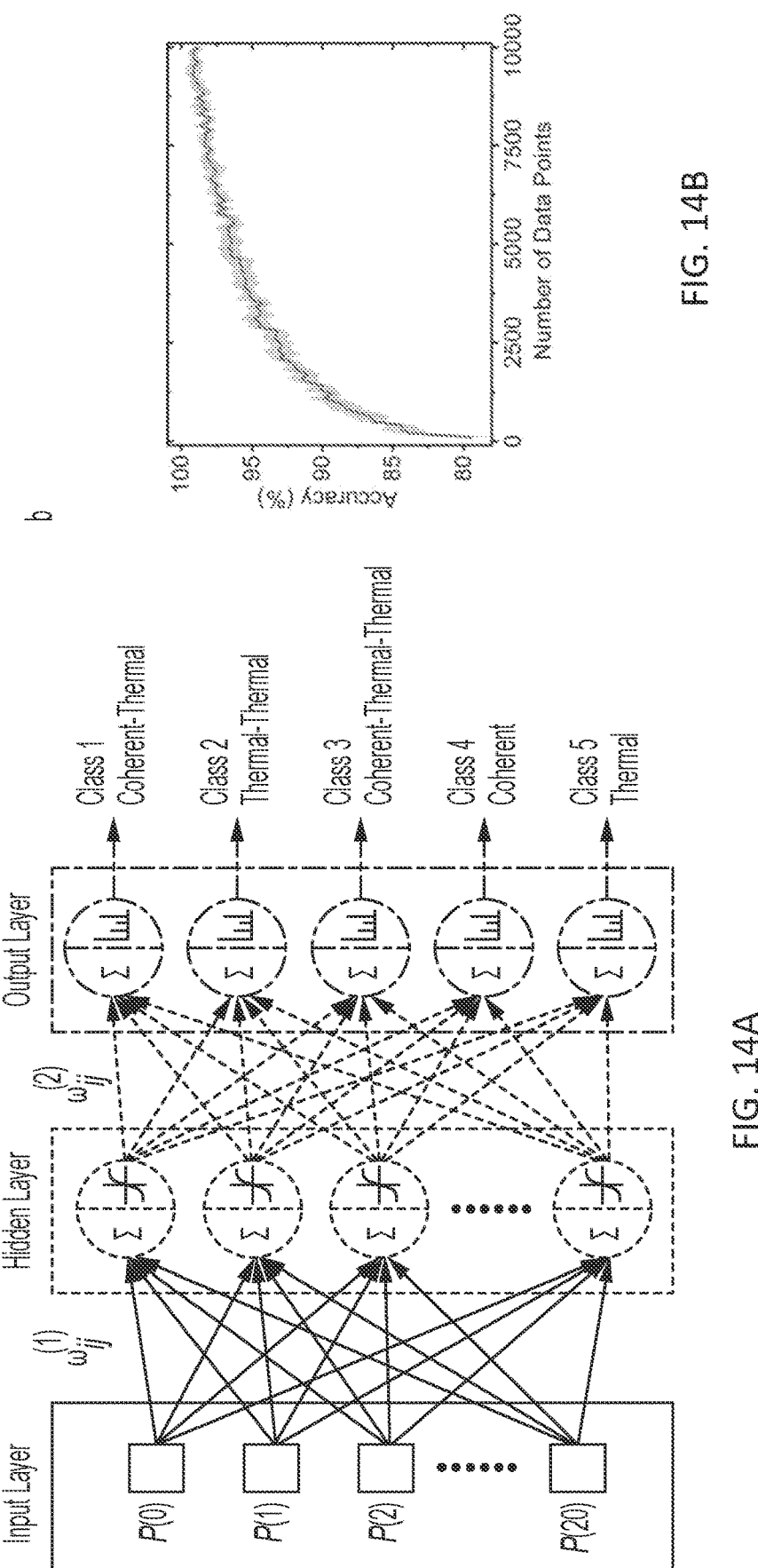
FIG. 14A shows a scheme of the two-layer neural network used to identify the photon statistics produced by a combination of three sources, according to an embodiment of the present invention.
FIG. 14B shows the performance of the present neural network as a function of the number of data samples used each time in the testing process, according to an embodiment of the present invention.

FIG. 14A shows a scheme of the two-layer neural network used to identify the photon statistics produced by a combination of three sources, according to an embodiment of the present invention. The computational model consists of an input layer, a hidden layer of sigmoid neurons, and a Softmax output layer. The training of our neural network through equation (4) and equation (5) enables the efficient identification of five classes of photon statistics. Each class is characterized by a $g^{(2)}$ function, which is defined by a specific combination of light sources. In the present experiment, these classes correspond to the characteristic photon statistics produced by coherent or thermal light sources and their combinations. For example, coherent-thermal, thermal-thermal, or coherent-thermal-thermal.

FIG. 14B shows the performance of the present neural network as a function of the number of data samples used each time in the testing process, according to an embodiment of the present invention. The classification accuracy for the five possible complex classes of light is 80% with 100 data points. Remarkably, the performance of the neural network increases to approximately 95% when we use 3500 data points in each test sample.

We demonstrate a proof-of-principle quantum camera using the experimental setup shown in FIG. 13B. For this purpose, we use a continuous-wave laser at 633 nm to produce either coherent, or incoherent superpositions of distinguishable, indistinguishable, or partially distinguishable light sources. In this case, the combination of photon sources acts as our target object. Then, we image our target object onto a digital micro-mirror device (DMD) that is used to implement raster scanning. This is implemented by selectively turning on and off groups of pixels in our DMD. The light reflected of the DMD is measured by a single-proton detector that allows us to perform photon-number-resolving detection.

The equations above allow us to implement a multilayer feed-forward network for the identification of the quantum photon fluctuations of the point sources of a target object. As shown in FIG. 14A, the structure of the network includes a group of interconnected neurons arranged in layers. In this case, the input features represent the probabilities of detecting n photons at a specific pixel, p(n), whereas the neurons in the last layer correspond to the classes to be identified. The input vector is then defined by twenty-one features corresponding to n=0,1, . . . , 20. We define five classes, which can be directly described through equation (4) and equation (5) if the brightness of our sources remains constant. However, if the brightness is modified, the classes can be defined through the $g^{(2)}=1+(\langle (\Delta \hat{n})^2 \rangle - \langle \hat{n} \rangle )/\langle \hat{n} \rangle^2$, which is intensity-independent. The parameters in the g(2) function can also be calculated from equations (4) and equation (5). It is important to mention that the output neurons provide a probability distribution over the predicted classes.

We test the performance of the present neural network through the classification of a complex mixture of photons produced by the combination of one coherent with two thermal light sources. The accuracy of our trained neural network is reported in FIG. 14B. In our setup, the three partially overlapping sources form five classes of light with different mean photon numbers and photon statistics. We exploit the functionality of our artificial neural network to identify the underlying quantum fluctuations that characterize each kind of light. We calculate the accuracy as the ratio of true positive and true negative to the total of input samples during the testing phase. FIG. 14B shows the overall accuracy as a function of the number of data points used to build the probability distributions for the identification of the multiple light sources using a supervised neural network. The classification accuracy for the mixture of three light sources is 80% with 100 photon-number-resolving measurements. The performance of the neural networks increases to approximately 95% when we use 3500 data points to generate probability distributions.

Figure 15A:
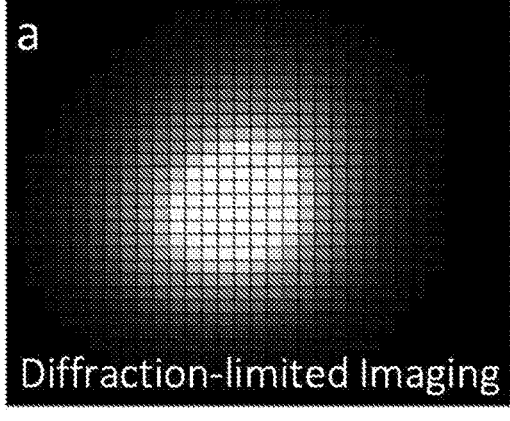
FIGS. 15A-15F show various aspects of the experimental super-resolving imaging, according to an embodiment of the present invention.
Figure 15B:
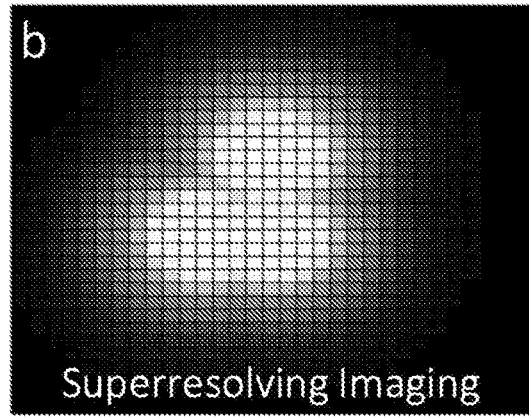
Figure 15C:
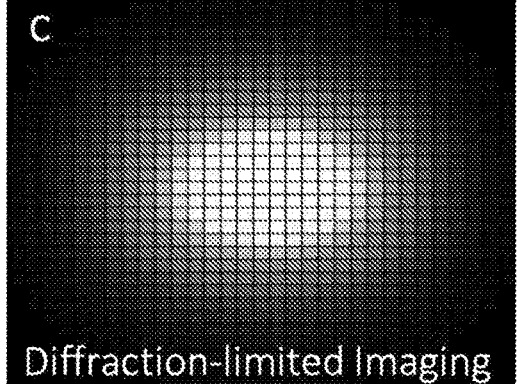
Figure 15D:
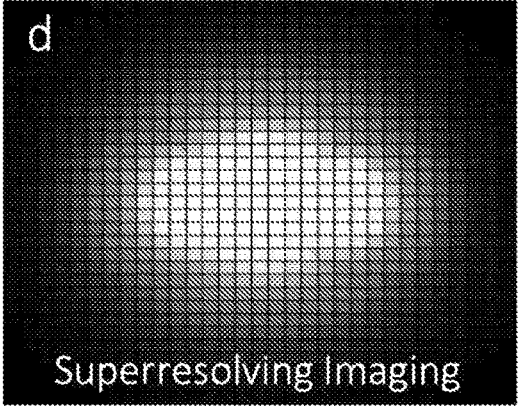
Figure 15E:
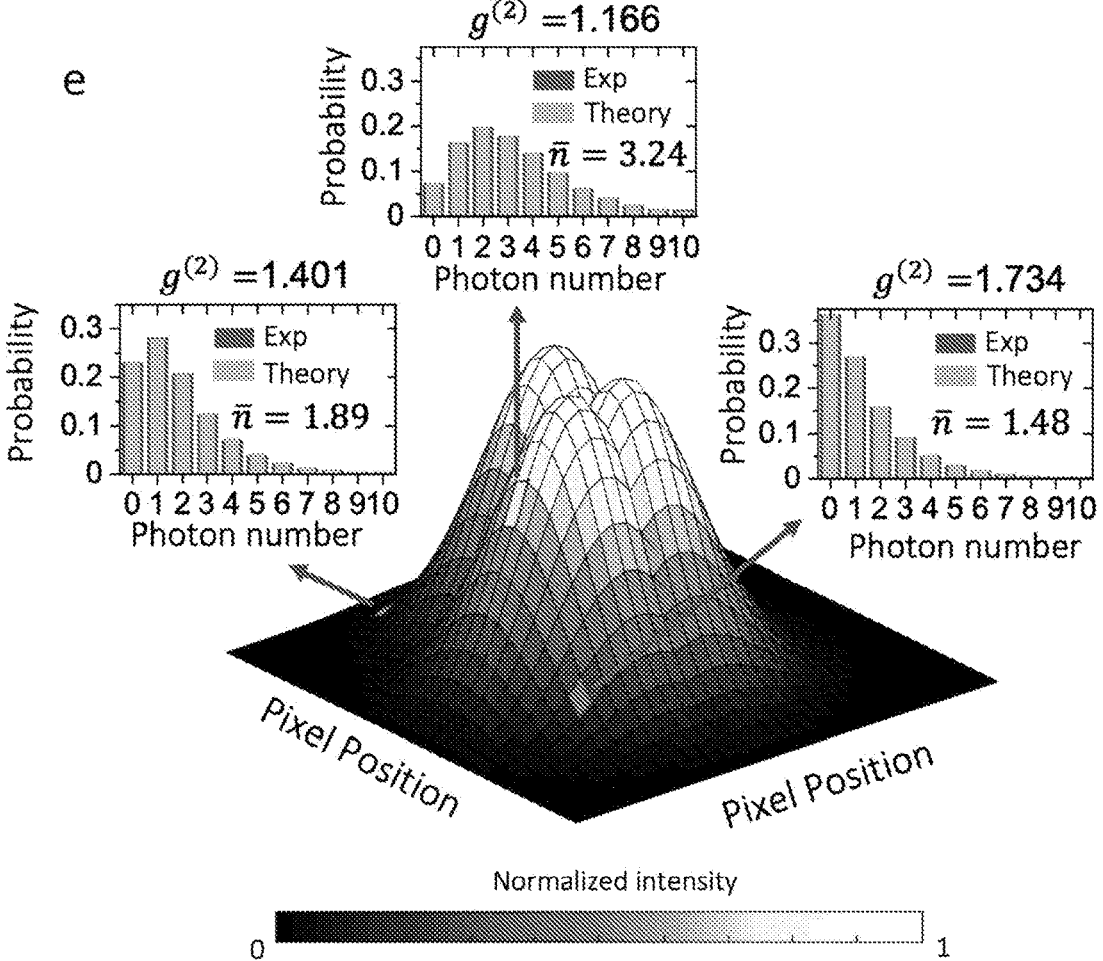
Figure 15F:
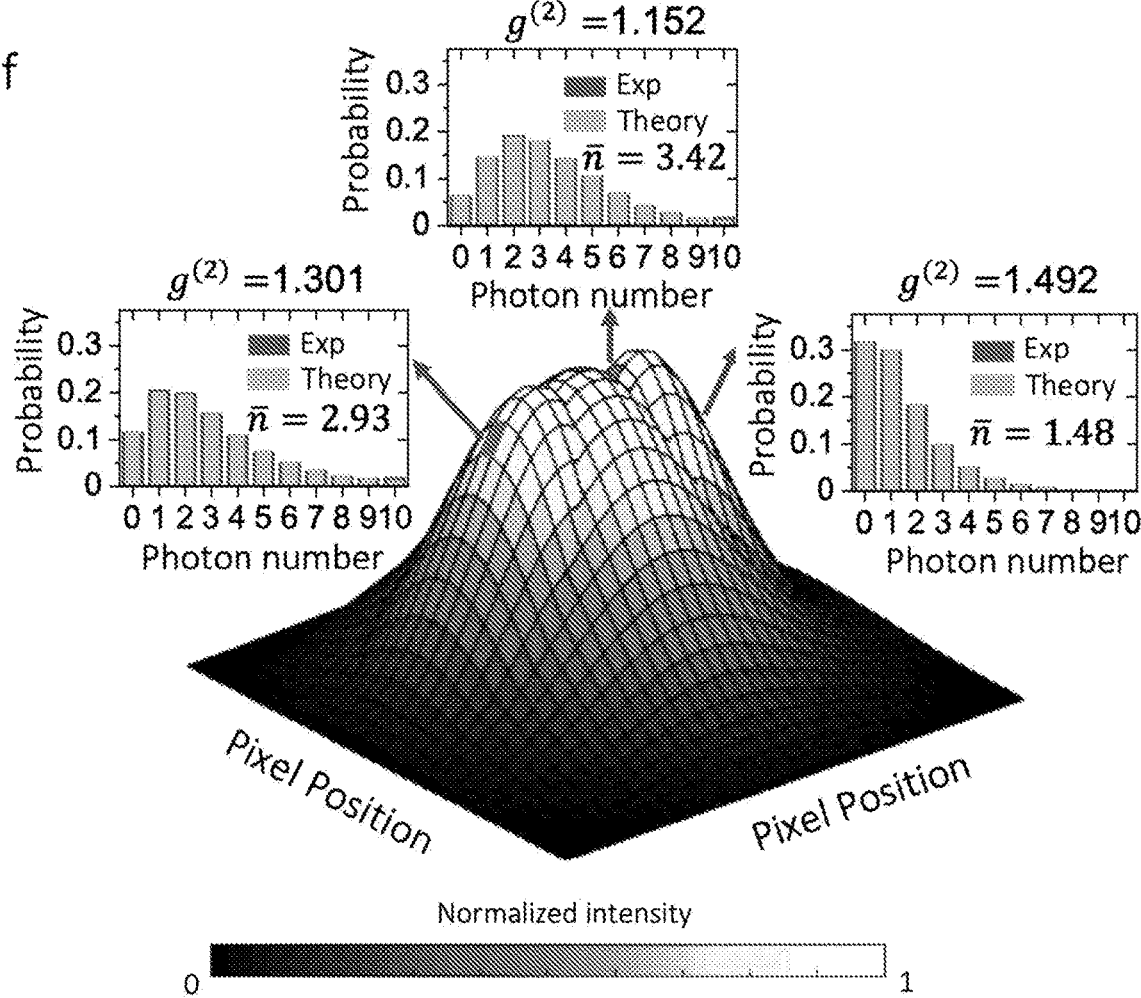

FIGS. 15A-15F show various aspects of the experimental super-resolving imaging, according to an embodiment of the present invention. The contour plot in FIG. 15A shows the combined intensity profile of the three partially distinguishable sources. As stipulated by the Abbe-Rayleigh resolution criterion, the transverse separations among the sources forbid their identification. The contour plot shown in FIG. 15B, shows that the present smart quantum camera enables super-resolving imaging of the remote sources. In FIGS. 15C and 15D, we show another experimental realization of our protocol for a different distribution of light sources. In this case, two small sources are located inside the point-spread function of a third light source. FIGS. 1E and 15F correspond to the inferred spatial distributions based on the experimental pixel-by-pixel imaging used to produce FIG. 15B and FIG. 15D. The insets in FIG. 15E and FIG. 15F show photon-number probability distributions for three pixels, the theory bars were obtained through equation (4) and equation (5). These results demonstrate the potential of our technique to outperform conventional diffraction-limited imaging.

As demonstrated in FIGS. 15A-15F, the identification of the quantum photon fluctuations at each pixel of our camera enables us to demonstrate super-resolving imaging. In our experiment we prepared each source to have a mean photon number between 1 and 1.5 for the brightest pixel. The raster-scan image of a target object composed of multiple partially distinguishable sources in FIG. 15A illustrates the performance of conventional imaging protocols limited by diffraction. In this case, it is practically impossible to identify the multiple sources that constitute the target object. Remarkably, as shown in FIG. 15B, our protocol provides a dramatic improvement of the spatial resolution of the imaging system. In this case, it becomes clear the presence of the three emitters that form the remote object. The estimation of separations among light sources is estimated through a fit over the classified pixel-by-pixel image. In FIG. 15C and FIG. 15D, we demonstrate the robustness of our protocol by performing super-resolving imaging for a different configuration of light sources. In this case, two small sources are located inside the point-spread function of a third light source. As shown in FIG. 15C, the Abbe-Rayleigh limit forbids the identification of light sources. However, we demonstrate substantial improvement of spatial resolution in FIG. 15D. The plots in FIG. 15E and FIG. 15F correspond to the inferred spatial distributions based on the experimental pixel-by-pixel imaging used to produce FIG. 15B and FIG. 15D. The insets in FIG. 15E and FIG. 15F show photon-number probability distributions for three pixels. The theoretical photon-number distributions in FIG. 15E and FIG. 15F are obtained through a procedure of least square regression. Our scheme enables the use of the photon-number distributions or their corresponding $g^{(2)}$ to characterize light sources. This allows us to determine each pixel's corresponding statistics, regardless of the mean photon numbers of the sources in the detected field.

Figure 16:
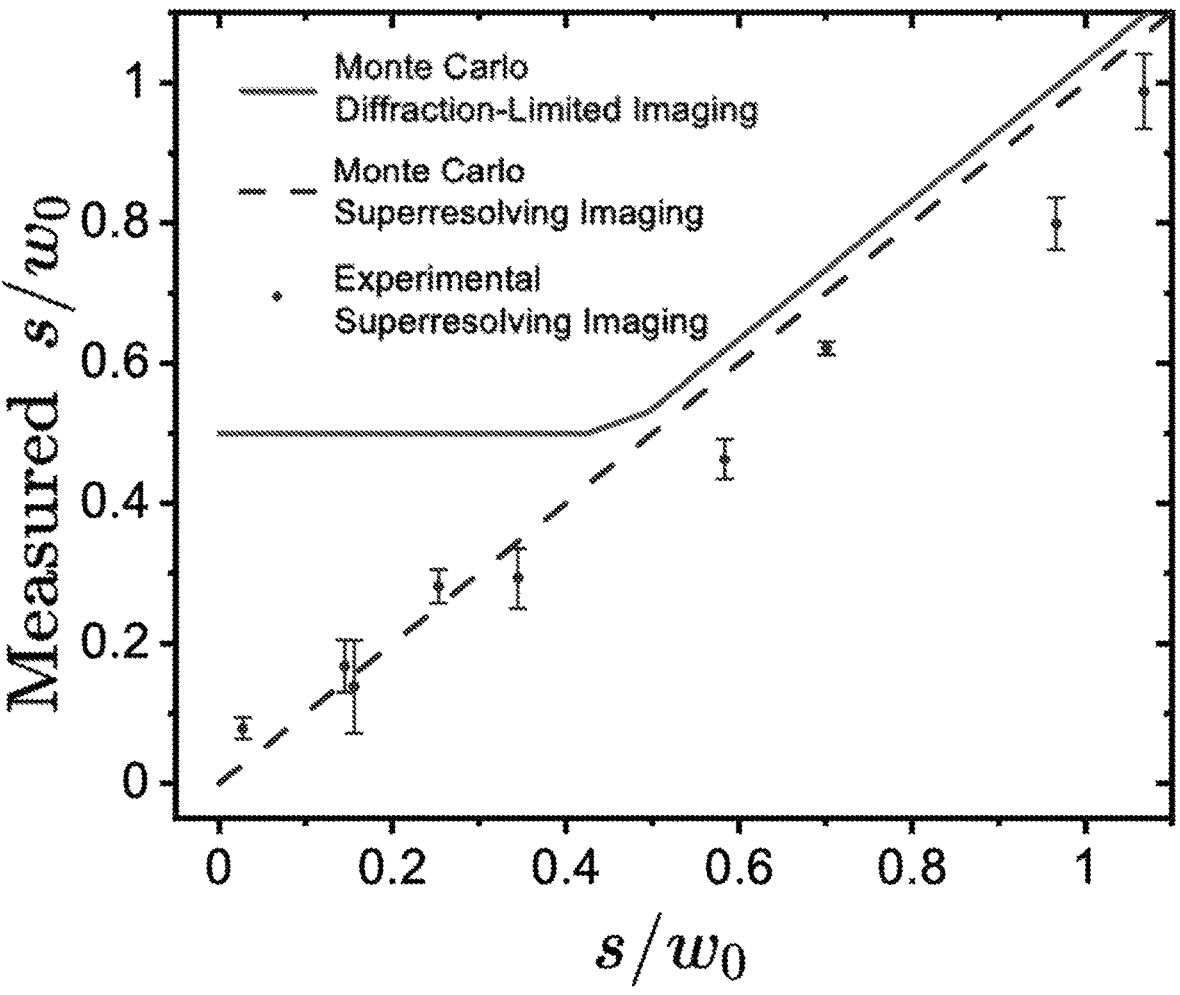
FIG. 16 shows a comparison between the spatial resolution of our camera and direct imaging, according to an embodiment of the present invention.

FIG. 16 shows a comparison between the spatial resolution of our camera and direct imaging, according to an embodiment of the present invention. The distance is normalized by the beam radius for easy identification of the Abbe-Rayleigh limit. The red line is the result of a Monte-Carlo simulation for traditional intensity based direct imaging. The plateau is the area where the algorithm becomes unstable and fits to one Gaussian. The dotted blue line represents the limit for our super-resolving imaging method, where perfect classification of each pixel is assumed. The blue dots represent the experimental data collected with our camera for super-resolving imaging. The experimental points demonstrate the potential of our technique for identifying spatial features beyond the Abbe-Rayleigh resolution criterion.

We now provide a quantitative characterization of our super-resolving imaging scheme based on the identification of photon statistics. We demonstrate that our smart camera for super-resolving imaging can capture small spatial features that surpass the resolution capabilities of conventional schemes for direct imaging. Consequently, as shown in FIG.

16, the present camera enables the possibility of performing imaging beyond the Abbe-Rayleigh criterion. In this case, we performed multiple experiments in which a superposition of partially distinguishable sources were imaged. The superposition was prepared using one coherent and one thermal light source. In FIG. 16, we plot the predicted transverse separation s normalized by the Gaussian beam waist radius $w_0$ for both protocols. Here $w_0 = \lambda/\pi NA$, this parameter is directly obtained from our experiment. As shown in FIG. 16, our protocol enables one to resolve small spatial separations between the sources even for diffraction-limited conditions. As expected for larger separation distances, the performance of our protocol matches the accuracy of intensity measurements. For completeness, we also performed Monte Carlo simulations of our experiment, which show an excellent agreement with our experimental data.

Derivation of the Many-source Photon Statistics: Let us start by considering the indistinguishable detection of N coherent and M thermal independent sources. To obtain the combined photon distribution, we make use of the Glauber-Sudarshan theory of coherence. Thus, we start by writing the P-functions associated to the fields produced by the indistinguishable coherent and thermal sources, that is, we write following equations (6) and (7).

$$P_{coh}(\alpha) = \int P_N^{coh}(\alpha - a_{N-1}) P_{N-1}^{coh}(\alpha_{N-1} - a_{N-2}) \tag{6}$$
$$\ldots P_2^{coh}(\alpha_2 - a_1) P_1^{coh}(\alpha_1) d^2 a_{N-1} d^2 a_{N-2} \ldots d^2 a_2 d^2 a_1,$$

$$P_{th}(\alpha) = \int P_M^{th}(\alpha - a_{M-1}) P_{M-1}^{th}(\alpha_{M-1} - a_{M-2}) \tag{7}$$
$$\ldots P_2^{th}(\alpha_2 - a_1) P_1^{th}(\alpha_1) d^2 a_{M-1} d^2 a_{M-2} \ldots d^2 a_2 d^2 a_1,$$

with $P_{coh}(\alpha)$ and $P_{th}(\alpha)$ standing for the P-functions of the combined N-coherent and M-thermal sources, respectively. In both equations, a stands for the complex amplitude as defined for coherent states $|\alpha\rangle$, and the individual-source P-functions are defined as following equations (8) and (9).

$$P_k^{coh}(\alpha) = \delta^2(\alpha - \alpha_k), \tag{8}$$

$$P_l^{th}(\alpha) = \frac{1}{\pi \bar{m}_l} \exp\left(-|\alpha|^2 / \bar{m}_l\right), \tag{9}$$

where $$P_k^{coh}(\alpha)$$

corresponds to the P-function of kth coherent source, with mean photon number $\bar{n}_k = |\alpha_k|^2$, and $$P_l^{th}(\alpha)$$

describes the lth thermal source, with mean photon number $\bar{m}_l$. Now, by substituting equation (8) into equation (6), and equation (9) into equation (7), we obtain equation (10) and equation (11), as follows.

$$P_{coh}(\alpha) = \delta^2\left(\alpha - \sum_{k=1}^{N} \alpha_k\right), \tag{10}$$

-continued $$P_{th}(\alpha) = \left(\frac{1}{\pi \sum_{l=1}^{M} \bar{m}_l}\right) \exp\left(-\frac{|\alpha|^2}{\sum_{l=1}^{M} \bar{m}_l}\right), \tag{11}$$

We can finally combine the thermal and coherent sources by writing equation (12), as follows.

$$P_{th-coh}(\alpha) = \int P_{th}(\alpha - \alpha') P_{coh}(\alpha') d^2\alpha' \tag{12}$$

Note that this expression enables the analytical description for the photon-number distribution of an arbitrary number of indistinguishable sources measured by a quantum detector. More specifically, we can write equation (13), as follows.

$$P_{th-coh}(n) = \langle n | \hat{\rho}_{th-coh} | n \rangle, \tag{13}$$

where $$\hat{\rho}_{th-coh} = \int P_{th-coh}(\alpha) |\alpha\rangle \langle \alpha| d^2\alpha, \tag{14}$$

describes the density matrix of the quantum states of the combined thermal-coherent field at the quantum detector. Thus, by substituting equation (12) into equation (14) and equation (13), we find that the photon distribution of the combined fields is given by equation (15), as follows.

$$P_{th-coh}(n) = \tag{15}$$

$$\frac{(m_{tot})^n \exp\left(-\frac{(|\alpha_{tot}|)^2}{m_{tot}}\right)}{\pi (m_{tot} + 1)^{n+1}} \times \sum_{k=0}^{n} \frac{1}{k! (n-k)!} \Gamma\left(\frac{1}{2} + n - k\right) \Gamma\left(\frac{1}{2} + k\right) \times$$

$${}_1F_1\left(\frac{1}{2} + n - k; \frac{1}{2}; \frac{(\text{Re}[\alpha_{tot}])^2}{m_{tot}(m_{tot} + 1)}\right) {}_1F_1\left(\frac{1}{2} + k; \frac{1}{2}; \frac{(\text{Im}[\alpha_{tot}])^2}{m_{tot}(m_{tot} + 1)}\right)$$

with $$m_{tot} = \sum_{l=1}^{M} \bar{m}_l \text{ and } \alpha_{tot} = \sum_{k=1}^{N} \alpha_k.$$

In this final result, $\Gamma(z)$ and ${}_1F_1(a; b; z)$ are the Euler gamma and the Kummer confluent hypergeometric functions, respectively.

Training of Neural Networks: For the sake of simplicity, we split the functionality of our neural network into two phases: the training and testing phase. In the first phase, the training data is fed to the network multiple times to optimize the synaptic weights through a scaled conjugate gradient back-propagation algorithm. This optimization seeks to minimize the Kullback-Leibler divergence distance between predicted and the real target classes. At this point, the training is stopped if the loss function does not decrease within 1000 epochs. In the test phase, we assess the performance of the algorithm by introducing an unknown set of data during the training process. For both phases, we prepare a data-set consisting of one thousand experimental measurements of photon statistics for each of the five classes. This process is formalized by considering different numbers of data points: 100, 500, . . . , 9500, 10000. Following a standardized ratio for statistical learning, we divide our data into training (70%), validation (15%), and testing (15%) sets. The networks were trained using the neural network toolbox in MATLAB, which runs on a computer Intel Core i7-4710MQ CPU (@2.50 GHz) with 32 GB of RAM.

Fittings: To determine the optimal fits for FIG. 15E and FIG. 15F, we design a search space based on equations (4) and (5). To do so we first found the mean photon number of the input pixel, which will later be applied to constrain the search space. From here we allowed for the existence of up to three distinguishable modes which will be combined according to equation (5). Each of the modes contains an indistinguishable combination of up to one coherent and two thermal sources whose number distribution is given by equation (4). The total combination results in partially distinguishable combination and provides the theoretical model for our experiment. From here our search space is $$\sqrt{\sum_{n=0}\left(p_{exp}(n) - p_{th}\left(n\middle|\vec{n}_{1,t}, \vec{n}_{2,t}, \vec{n}_c\right)\right)^2},$$

where $\vec{n}_{i,t}$ and $\vec{n}_c$ are the mean photon numbers of that each thermal or coherent source contributes to each distinguishable mode respectively. The mean photon numbers of each source must add up to the experimental mean photon number, constraining the search. A linear search was then performed over the predicted mean photon numbers and the minimum was returned, providing the optimal fit.

Monte-Carlo Simulation of the Experiment: To demonstrate a consistent improvement over traditional methods, we also simulated the experiment using two beams, a thermal and a coherent, with Gaussian point spread functions over a 128×128 grid of pixels. At each pixel, the mean photon number for each source is provided by the Gaussian point spread function, which is then used to create the appropriate distinguishable probability distribution as given in equation (5), creating a 128×128 grid of photon number distributions. The associated class data for these distributions will then be fitted to a set of pre-labeled disks using a genetic algorithm. This recreates our method in the limits of perfect classification. Each of these distributions is then used to simulate photon-number resolving detection. This data is then used to create a normalized intensity for the classical fit. We fit the image to a combination of Gaussian PSFs. This process is repeated ten times for each separation in order to average out fluctuations in the fitting. When combining the results of the intensity fits they are first divided into two sets. One set has the majority of fits returns a single Gaussian, while the other returned two Gaussian the majority of the time. The set identified as only containing a single Gaussian is then set at the Abbe-Rayleigh diffraction limit, while the remaining data is used in a linear fit. This causes the sharp transition between the two sets of data.

We demonstrated a robust quantum camera that enables super-resolving imaging beyond the Abbe-Rayleigh resolution limit. The demonstrated protocol exploits the self-learning features of artificial intelligence to identify the statistical fluctuations of truly unknown mixtures of light sources. Our smart camera relies on a general model based on the theory of quantum coherence to describe the photon statistics produced by the scattering of an arbitrary number of light sources. We demonstrated that the measurement of the quantum statistical fluctuations of photons enables us to overcome inherent limitations of existing super-resolution protocols based on spatial mode projections. We believe that our work represents a new paradigm in the field of optical imaging with important implications for microscopy, remote sensing, and astronomy.

For more than twenty years, there has been an enormous interest in reducing the number of photons and measurements required to perform imaging, remote sensing and metrology at extremely low-light levels. In this regard, photonic technologies operating at low-photon levels utilize weak photon signals that make them vulnerable against detection of environmental photons emitted from natural sources of light. Indeed, this limitation has made unfeasible the realistic implementation of this family of technologies. So far, this vulnerability has been tackled through conventional approaches that rely on the measurement of coherence functions, the implementation of thresholding and quantum state tomography. Unfortunately, these approaches to characterize photon-fluctuations rely on the acquisition of large number of measurements that impose constraints on the identification of light sources. Here, for the first time, we have demonstrated a smart protocol for discrimination of light sources at mean photon numbers below one. Embodiments of the present invention demonstrate a dramatic improvement of several orders of magnitude in both the number of photons and measurements required to identify light sources. Furthermore, our results indicate that a single artificial neuron outperforms naive Bayes classifier at low-light levels. Interestingly, this neuron has simple analytical and computational properties that enable low-complexity and low-cost implementations of our technique. The present method and system has important implications for multiple photonic technologies, such as LIDAR and microscopy of biological materials.

REFERENCES 1-1. R. J. Glauber, "The quantum theory of optical coherence," Phys. Rev. 130, 2529 (1963). https://doi.org/10.1103/PhysRev.130.2529, Google ScholarCrossref 1-2. L. Mandel and E. Wolf, Optical Coherence and Quantum Optics, Cambridge Uni-versity Press (1995). Google ScholarCrossref 1-3. L. Mandel, "Sub-Poissonian photon statistics in resonance fluorescence," Opt. Lett. 4, 205-207 (1979). https://doi.org/10.1364/OL.4.000205, Google ScholarCrossref 1-4. L. Mandel and E. Wolf, "Coherence properties of optical fields," Rev. Mod. Phys. 37, 231 (1965). https://doi.org/10.1103/RevModPhys.37.231, Google ScholarCrossref 1-5. J. Liu and Y. Shih, "Nth-order coherence of thermal light," Phys. Rev. A 79, 023819 (2009). https://doi.org/10.1103/PhysRevA.79.023819, Google ScholarCrossref 1-6. J. Hloušek, M. Dudka, I. Straka, and M. Ježek, "Accurate detection of arbitrary photon statistics," Phys. Rev. Lett. 123, 153604 (2019). https://doi.org/10.1103/PhysRevLett.123.153604, Google ScholarCrossref 1-7. L. Dovrat, M. Bakstein, D. Istrati, A. Shaham, and H. S. Eisenberg, "Measure-ments of the dependence of the photon-number distribution on the number of modes in parametric down-conversion," Opt. Express 20, 2266-2276 (2012). https://doi.org/10.1364/OE.20.002266, Google ScholarCrossref 1-8. L. Dovrat, M. Bakstein, D. Istrati, E. Megidish, A. Halevy, L. Cohen, and H. S. Eisenberg, "Direct observation of the degree of correlations using photon-number-resolving detectors," Phys. Rev. A 87, 053813 (2013). https://doi.org/10.1103/PhysRevA.87.053813, Google ScholarCrossref 1-9. G. Zambra, A. Andreoni, M. Bondani, M. Gramegna, M. Genovese, G. Brida, A. Rossi, and M. G. A. Paris, "Experimental reconstruction of photon statistics with-out photon counting," Phys. Rev. Lett. 95, 063602 (2005). https://doi.org/10.1103/PhysRevLett.95.063602, Google ScholarCrossref 1-10. L. A. Howard, G. G. Gillett, M. E. Pearce, R. A. Abrahao, T. J. Weinhold, P. Kok, and A. G. White, "Optimal imaging of remote bodies using quantum detectors," Phys. Rev. Lett. 123, 143604 (2019). https://doi.org/10.1103/PhysRevLett.123.143604, Google ScholarCrossref 1-11. A. Ling, A. Lamas-Linares, and C. Kurtsiefer, "Accuracy of minimal and opti-mal qubit tomography for finite-length experiments," arXiv pre-print arXiv:0807.0991 (2008). Google Scholar 1-12. J. P. Dowling and K. P. Seshadreesan, "Quantum optical technologies for me-trology, sensing, and imaging," J. Light. Technol. 33, 2359 (2015). https://doi.org/10.1109/JLT.2014.2386795, Google ScholarCrossref 1-13. Y. Sher, L. Cohen, D. Istrati, and H. S. Eisenberg, "Low intensity LiDAR using compressed sensing and a photon number resolving detector," Emerging Digital Mi-cromirror Device Based Syst. Appl. X 10546, 105460J (2018). https://doi.org/10.1117/12.2289847, Google ScholarCrossref 1-14. Q. Wang, L. Hao, Y. Zhang, C. Yang, X. Yang, L. Xu, and Y. Zhao, "Optimal detection strategy for super-resolving quantum LiDAR," J. Appl. Phys. 119, 023109 (2016). https://doi.org/10.1063/1.4939777, Google ScholarScitation, ISI 1-15. J. P. Dowling, "Quantum optical metrology—the lowdown on High-NOON states," Contemp. Phys 49, 125-143 (2008). https://doi.org/10.1080/00107510802091298, Google ScholarCrossref 1-16. O. S. Magaña-Loaiza, R. J. León-Montiel, A. Perez-Leija, A. B. U'Ren, C. You, K. Busch, A. E. Lita, S. W. Nam, R. P. Mirin, and T. Gerrits, "Multiphoton quan-turn-state engineering using conditional measurements," Npj Quantum Inf. 5, 80 (2019). https://doi.org/10.1038/s41534-019-0195-2, Google ScholarCrossref 1-17. O. S. Magaña-Loaiza and R. W. Boyd, "Quantum imaging and information," Rep. Prog. Phys. 82, 124401 (2019). https://doi.org/10.1088/1361-6633/ab5005, Google ScholarCrossref 1-18. Y. LeCun, Y. Bengio, and G. Hinton, "Deep learning," Nature 521, 436-444 (2015). https://doi.org/10.1038/nature14539, Google ScholarCrossref 1-19. G. Carleo, I. Cirac, K. Cranmer, L. Daudet, M. Schuld, N. Tishby, L. Vogt-Maranto, and L. Zdeborová, "Machine learning and the physical sciences," Rev. Mod. Phys. 91, 045002 (2019). https://doi.org/10.1103/RevModPhys.91.045002, Google ScholarCrossref 1-20. J. Biamonte, P. Wittek, N. Pancotti, P. Rebentrost, N. Wiebe, and S. Lloyd, "Quantum machine learning," Nature 549, 195-202 (2017). https://doi.org/10.1038/nature23474, Google ScholarCrossref 1-21. V. Dunjko, J. M. Taylor, and H. J. Briegel, "Quantum-enhanced machine learning," Phys. Rev. Lett. 117, 130501 (2016). https://doi.org/10.1103/PhysRevLett.117.130501, Google ScholarCrossref 1-22. A. Hentschel and B. C. Sanders, "Machine learning for precise quantum meas-urement," Phys. Rev. Lett. 104, 063603 (2010). https://doi.org/10.1103/PhysRevLett.104.063603, Google ScholarCrossref 1-23. A. Lumino, E. Polino, A. S. Rab, G. Milani, N. Spagnolo, N. Wiebe, and F. Sciar-rino, "Experimental phase estimation enhanced by machine learning," Phys. Rev. Appl. 10, 044033 (2018). https://doi.org/10.1103/PhysRevApplied.10.044033, Google ScholarCrossref

1-24. A. A. Melnikov, H. P. Nautrup, M. Krenn, V. Dunjko, M. Tiersch, A. Zeilinger, and H. J. Briegel, "Active learning machine learns to create new quantum experiments," PNAS 115, 1221-1226 (2018). https://doi.org/10.1073/pnas.1714936115, Google ScholarCrossref 1-25. C. L. Cortes, S. Adhikari, X. Ma, and S. K. Gray, "Accelerating quantum optics experiments with statistical learning," arXiv pre-print arXiv:1911.05935 (2019). Google Scholar 1-26. Z. A. Kudyshev, S. Bogdanov, T. Isacsson, A. V. Kildishev, A. Boltasseva, and V. M. Shalaev, "Rapid classification of quantum sources enabled by machine learning," arXiv preprint arXiv:1908.08577 (2019). Google Scholar 1-27. S. Lohani and R. T. Glasser, "Turbulence correction with artificial neural net-works," Opt. Lett. 43, 2611-2614 (2018). https://doi.org/10.1364/OL.43.002611, Google ScholarCrossref 1-28. J. Gao, L.-F. Qiao, Z.-Q. Jiao, Y.-C. Ma, C.-Q. Hu, R.-J. Ren, A.-L. Yang, H. Tang, M.-H. Yung, and X.-M. Jin, "Experimental machine learning of quantum states," Phys. Rev. Lett. 120, 240501 (2018). https://doi.org/10.1103/PhysRevLett.120.240501, Google ScholarCrossref 1-29. G. Torlai, G. Mazzola, J. Carrasquilla, M. Troyer, R. Melko, and G. Carleo, "Neural-network quantum state tomography," Nat. Phys. 14, 447-450 (2018). https://doi.org/10.1038/s41567-018-0048-5, Google ScholarCrossref 1-30. F. Flamini, N. Spagnolo, and F. Sciarrino, "Visual assessment of multi-photon interference," Quantum Sci. Technol. 4, 024008 (2019). https://doi.org/10.1088/2058-9565/ab04fc, Google ScholarCrossref 1-31. I. Agresti, N. Viggianiello, F. Flamini, N. Spagnolo, A. Crespi, R. Osellame, N. Wiebe, and F. Sciarrino, "Pattern recognition techniques for Boson sampling valida-tion," Phys. Rev. X 9, 011013 (2017). https://doi.org/10.1103/PhysRevX.9.011013, Google ScholarCrossref 1-32. M. Bentivegna, N. Spagnolo, C. Vitelli, D. Brod, A. Crespi, F. Flamini, R. Ram-poni, P. Mataloni, R. Osellame, E. Galvão, and F. Sciarrino, "Bayesian approach to Boson sampling validation," Int. J. Quantum Inf. 12, 1560028 (2014). https://doi.org/10.1142/S021974991560028X, Google ScholarCrossref 1-33. S. M. H. Rafsanjani, M. Mirhosseini, O. S. Magaña-Loaiza, B. T. Gard, R. Birrittella, B. E. Koltenbah, C. G. Parazzoli, B. A. Capron, C. C. Gerry, J. P. Dowling, and R. W. Boyd, "Quantum-enhanced interferometry with weak thermal light," Optica 4, 487-491 (2017). https://doi.org/10.1364/OPTICA.4.000487, Google ScholarCrossref 1-34. I. A. Burenkov, A. K. Sharma, T. Gerrits, G. Harder, T. J. Bartley, C. Silberhorn, E. A. Goldschmidt, and S. V. Polyakov, "Full statistical mode reconstruction of a light field via a photon-number-resolved measurement," Phys. Rev. A. 95, 053806 (2017). https://doi.org/10.1103/PhysRevA.95.053806, Google ScholarCrossref 1-35. N. Montaut, O. S. Magaña-Loaiza, T. J. Bartley, V. B. Verma, S. W. Nam, R. P. Mirin, C. Silberhorn, and T. Gerrits, "Compressive characterization of telecom photon pairs in the spatial and spectral degrees of freedom," Optica 5, 1418 (2018). https://doi.org/10.1364/OPTICA.5.001418, Google ScholarCrossref 1-36. B. Windrow and M. E. Hoff, "Adaptive switching circuits," "Technical report no. 1553-1," Stanford University, Stanford-California, Stanford Electronics Laboratories (1960). Google ScholarCrossref

1-37. S. I. Gallant, Neural Network Learning and Expert Systems, MIT Press (1993). Google ScholarCrossref 1-38. A. Gelman, J. B. Carlin, H. S. Stern, D. B. Dunson, A. Vehtari, and D. B. Ru-bin, Bayesian Data Analysis, Chapman and Hall/CRC (2013). Google Schol-arCrossref 1-39. J. B. Ramsey, The Elements of Statistics: With Applications to Economics and the Social Sciences, Cengage Learning (2001). Google Scholar 1-40. C. H. Helstrom, Quantum Detection and Estimation Theory, Academic Press (1976). Google Scholar 1-41. Z. Puchala, L. Pawela, and K. Życzkowski, "Distinguishability of generic quan-turn states," Phys. Rev. A 93, 062112 (2016). https://doi.org/10.1103/PhysRevA.93.062112, Google ScholarCrossref 1-42. H. Chernoff, "A measure of asymptotic efficiency for tests of a hypothesis based on the sum of observations," Ann. Math. Stat. 23, 493-507 (1952). https://doi.org/10.1214/aoms/1177729330, Google ScholarCrossref 1-43. K. M. R. Audenaert, J. Calsamiglia, R. Muñoz-Tapia, E. Bagan, L. Masanes, A. Acin, and F. Verstraete, "Discriminating states: The quantum Chernoff bound," Phys. Rev. Lett. 98, 160501 (2007). https://doi.org/10.1103/PhysRevLett.98.160501, Google ScholarCrossref 1-44. L. Cohen, E. S. Matekole, Y. Sher, D. Istrati, H. S. Eisenberg, and J. P. Dowling, "Thresholded quantum LiDAR: Exploiting photon-number-resolving detection," Phys. Rev. Lett 123, 203601 (2019). https://doi.org/10.1103/PhysRevLett.123.203601, Google ScholarCrossref 1-45. I. Goodfellow, Y. Bengio, and A. Courville, Deep Learning, MIT Press (2016). Google Scholar 1-46. C. Bishop, Pattern Recognition and Machine Learning, Springer (2006). Google Scholar 1-47. B. Windrow, M. E. Hoff. *Adaptive switching circuits*, Technical Report No. 1553-1, Stanford University, Stanford-California, Stanford Electronics Laboratories (1960)

1-48. S. I. Gallant, *Neural network learning and expert systems*, MIT press (1993))

1-49. A. Cauchy, *Méthode générale pour la résolution des systemes d'équations simultanées*, Comp. Rend. Sci. Paris 25.1847, pp. 536-538 (1847)

2-1. R. J. Glauber, "The Quantum Theory of Optical Coherence," Phys. Review 130, 2598 (1963).

2-2. L. Mandel and E. Wolf "Optical Coherence and Quantum optics," Cambridge: Cambridge University Press (1995).

2-3. L. Mandel, "Sub-Poissonian photon statistics in resonance fluorescence," Opt. Lett. 4, 205-207 (1979).

2-4. L. Mandel and E. Wolf, "Coherence properties of optical fields," Rev. Mod. Phys. 37, 231 (1965).

2-5. J. Liu, and Y. Shih, "Nth-order coherence of thermal light," Phys. Rev. A 79, 023819 (2009).

2-6. J. Hlousek, M. Dudka, I. Straka, and M. Jazek, "Accurate Detection of Arbitrary Photon Statistics," Phys. Rev. Lett. 123, 153604 (2019).

2-7. L. Dovrat, M. Bakstein, D. Istrati, A. Shaham, and H. S. Eisenberg, "Measurements of the dependence of the photon-number distribution on the number of modes in parametric down-conversion," Opt. Express 20, 2266-2276 (2012)

2-8. L. Dovrat, M. Bakstein, D. Istrati, E. Megidish, A. Halevy, L. Cohen and H. S. Eisenberg, "Direct observation of the degree of correlations using photon-number-resolving detectors," Phys. Rev. A 87, 053813 (2013).

2-9. G. Zambra, A. Andreoni, M. Bondani, M. Gramegna, M. Genovese, G. Brida, A. Rossi, and M. G. A. Paris,

24

"Experimental Reconstruction of Photon Statistics without Photon Counting," Phys. Rev. Lett. 95, 063602 (2005).

2-10. L. A. Howard, G. G. Gillett, M. E. Pearce, R. A. Abrahao, T. J. Weinhold, P. Kok, and A. G. White, "Optical Imaging of Remote Bodie using Quantum Detectors," Phys. Rev. Lett. 123, 143604 (2019).

2-11. J. P. Dowling, and K. P. Seshadreesan, "Quantum Optical Technologies for Metrology, Sensing, and Imaging," J. Light. Technol. 33, 2359 (2015).

2-12. Y. Sher, L. Cohen, D. Istrati, and H. S. Eisenberg, "Low intensity lidar using compressed sensing and a photon number resolving detector," Emerging Digital Micromirror Device Based Systems and Applications X 10546, 105460J (2018).

2-13. Q. Wang, L. Hao, Y. Zhang, C. Yang, X. Yang, L. Xu, and Y. Zhao, "Optimal detection strategy for super-resolving quantum lidar," J. Appl. Phys. 119, 023109 (2016).

2-14. J. P. Dowling, "Quantum optical metrology—the lowdown on High-NOON states," Contemp. Phys 49, 125-143 (2008).

2-15. O. S. Magana-Loaiza, R. J. Leon-Montiel, A. Perez-Leija, A. B. URen, C. You, K. Busch, A. E. Lita, S. W. Nam, R. P. Mirin, T. Gerrits, "Multiphoton Quantum-State Engineering using Conditional Measurements," npj Quantum Information 5, 80 (2019).

2-16. Y. LeCun, Y. Bengio, and G. Hinton, "Deep learning," Nature 521, 436-444 (2015).

2-17. J. Biamonte, P. Wittek, N. Pancotti, P. Rebentrost, N. Wiebe, and S. Lloyd, "Quantum Machine Learning," Nature 549, 195-202 (2017).

2-18. V. Dunjko, J. M. Taylor, H. J. Briegel, "Quantum-Enhanced Machine Learning," Phys. Rev. Lett. 117, 130501 (2016).

2-19. A. Hentschel, and B. C. Sanders, "Machine Learning for Precise Quantum Measurement," Phys. Rev. Lett. 104, 063603 (2010).

2-20. A. Lumino, E. Polino, A. S. Rab, G. Milani, N. Spagnolo, N. Wiebe, and F. Sciarrino, "Experimental Phase Estimation Enhanced by Machine Learning," Phys. Rev. Appl. 10, 044033 (2018).

2-21. A. A. Melnikov, H. P. Nautrup, M. Krenn, V. Dunjko, M. Tiersch, A. Zeilinger and H. J. Briegel, "Active learning machine learns to create new quantum experiments," PNAS 6, 1221-1226 (2018).

2-22. S. Lohani, R. T. Glasser, "Turbulence correction with artificial neural networks," Opt. Lett. 43, 2511-2614 (2018).

2-23. J. Gao, L.-F. Qiao, Z.-Q. Jiao, Y.-C. Ma, C.-Q. Hu, R.-J. Ren, A.-L. Yang, H. Tang, M.-H. Yung, and X.-M. Jin, "Experimental Machine Learning of Quantum States," Phys. Rev. Lett. 120, 240501 (2018).

2-24. G. Torlai, G. Mazzola, J. Carrasquilla, M. Troyer, R. Melko, and G. Carleo, "Neural-network quantum state tomography," Nat. Phys. 14, 447-450 (2018).

2-25. S. M. H. Rafsanjani, M. Mirhosseini, O. S. Magaña-Loaiza, B. T. Gard, R. Birrittella, B. E. Koltenbah, C. G. Parazzoli, B. A. Capron, C. C. Gerry, J. P. Dowling, and R. W. Boyd, "Quantum-enhanced interferometry with weak thermal light," Optica 4, 487-491 (2017).

2-26. I. A. Burenkov, A. K. Sharma, T. Gerrits, G. Harder, T. J. Bartley, C. Silberhorn, E. A. Goldschmidt, and S. V. Polyakov, "Full statistical mode reconstruction of a light field via a photon-number-resolved measurement", Phys. Rev. A. 95, 053806 (2017)

2-27. N. Montaut, O. S. Magaa-Loaiza, T. J. Bartley, V. B. Verma, S. W. Nam, R. P. Mirin, C. Silberhorn, and T. Gerrits, "Compressive characterization of telecom photon pairs in the spatial and spectral degrees of freedom", Optica 11, 1418 (2018)

2-28. B. Windrow, M. E. Hoff, "Adaptive switching circuits," Technical Report No. 1553-1, Stanford University, Stanford-California, Stanford Electronics Laboratories (1960).

2-29. S. I. Gallant, "Neural network learning and expert systems," MIT press (1993).

2-30. A. Cauchy, "Méthode générale pour la résolution des systemes déquations simultanées," Comp. Rend. Sci. Paris 25.1847, pp. 536-538 (1847).

2-31. A. Gelman, J. B. Carlin, H. S. Stern, D. B. Dunson, A. Vehtari, D. B. Rubin, "Bayesian Data Analysis," Chapman and Hall/CRC (2013).

2-32. O. S. Magana-Loaiza, and R. W. Boyd, "Quantum Imaging and Information," Reports on Progress in Physics, in press (2019).

2-33. L. Cohen, E. S. Matekole, Y. Sher, D. Istrati, H. S. Eisenberg, and J. P Dowling, "Thresholded Quantum LIDAR—Exploiting Photon-Number-Resolving Detection", Phys. Rev. Lett., in press (2019)

2-34. Goodfellow, Ian, Yoshua Bengio, and Aaron Courville. Deep learning. MIT press, 2016.

2-35. Bishop, Christopher M. Pattern recognition and machine learning. Springer, 2006.

3-1. E. Abbe, Beiträge zur theorie des mikroskops and dermikroskopischen wahrnehmung, Archiv für mikroskopis-che Anatomie 9, 413 (1873).

3-2. L. Rayleigh, Xxxi. investigations in optics, with special reference to the spectroscope, The London, Edinburgh, and Dublin Philosophical Magazine and Journal of Science 8, 261 (1879).

3-3. M. Born and E. Wolf, *Principles of optics: electromagnetic theory of propagation, interference and diffraction of light* (Elsevier, 2013).

3-4. J. W. Goodman, *Introduction to Fourier optics* (Roberts and Company Publishers, 2005).

3-5. O. S. Magaña-Loaiza and R. W. Boyd, Quantum imaging and information, Rep. Progr. Phys. 82, 124401 (2019).

3-6. R. Won, Eyes on super-resolution, Nat. Photonics 3, 368 (2009).

3-7. E. H. K. Stelzer, Beyond the diffraction limit?, Nature 417, 806 (2002).

3-8. M. I. Kolobov and C. Fabre, Quantum limits on optical resolution, Phys. Rev. Lett. 85, 3789 (2000).

3-9. E. H. K. Stelzer and S. Grill, The uncertainty principle applied to estimate focal spot dimensions, Opt. Commun. 173, 51 (2000).

3-10. Beyond the diffraction limit, Nat. Photonics 3, 361 (2009).

3-11. S. Pirandola, B. R. Bardhan, T. Gehring, C. Weedbrook, and S. Lloyd, Advances in photonic quantum sensing, Nat. Photon. 12, 724 (2018).

3-12. S. W. Hell, S. J. Sahl, M. Bates, X. Zhuang, R. Heintz-mann, M. J. Booth, J. Bewersdorf, G. Shtengel, H. Hess, P. Tinnefeld, A. Honigmann, S. Jakobs, I. Testa, L. Cognet, B. Lounis, H. Ewers, S. J. Davis, C. Eggeling, D. Klenerman, K. I. Willig, G. Vicidomini, M. Castello, A. Diaspro, and T. Cordes, The 2015 super-resolution microscopy roadmap, J. Phys. D: Appl. Phys. 48, 443001 (2015).

3-13. M. Tsang, Quantum imaging beyond the diffraction limit by optical centroid measurements, Phys. Rev. Lett. 102, 253601 (2009).

3-14. M. Tsang, R. Nair, and X.-M. Lu, Quantum theory of superresolution for two incoherent optical point sources, Phys. Rev. X 6, 031033 (2016).

3-15. S. W. Hell and J. Wichmann, Breaking the diffraction resolution limit by stimulated emission: stimulated-emission-depletion fluorescence microscopy, Opt. Lett. 19, 780 (1994). 3-16. M. Paúr, B. Stoklasa, J. Grover, A. Krzic, L. L. Sánchez-Soto, Z. Hradil, and J. Rehácek, Tempering Rayleigh's curse with PSF shaping, Optica 5, 1177 (2018).

3-17. F. Tamburini, G. Anzolin, G. Umbriaco, A. Bianchini, and C. Barbieri, Overcoming the Rayleigh criterion limit with optical vortices, Phys. Rev. Lett. 97, 163903 (2006).

3-18. W.-K. Tham, H. Ferretti, and A. M. Steinberg, Beating rayleigh's curse by imaging using phase information, Phys. Rev. Lett. 118, 070801 (2017).

3-19. Y. Zhou, J. Yang, J. D. Hassett, S. M. H. Rafsanjani, M. Mirhosseini, A. N. Vamivakas, A. N. Jordan, Z. Shi, and R. W. Boyd, Quantum-limited estimation of the axial separation of two incoherent point sources, Optica 6, 534 (2019).

3-20. P. Boucher, C. Fabre, G. Labroille, and N. Treps, Spatial optical mode demultiplexing as a practical tool for optimal transverse distance estimation, Optica 7, 1621 (2020).

3-21. W. Larson and B. E. A. Saleh, Resurgence of Rayleigh's curse in the presence of partial coherence, Optica 5, 1382 (2018).

3-22. K. Liang, S. A. Wadood, and A. N. Vamivakas, Coherence effects on estimating two-point separation, Optica 8, 243 (2021).

3-23. A. N. Boto, P. Kok, D. S. Abrams, S. L. Braunstein, C. P. Williams, and J. P. Dowling, Quantum interferometric optical lithography: Exploiting entanglement to beat the diffraction limit, Phys. Rev. Lett. 85, 2733 (2000).

3-24. Z. S. Tang, K. Durak, and A. Ling, Fault-tolerant and finite-error localization for point emitters within the diffraction limit, Opt. Express 24, 22004 (2016).

3-25. M. Parniak, S. Borówka, K. Boroszko, W. Wasilewski, K. Banaszek, and R. Demkowicz-Dobrzanski, Beating the Rayleigh limit using two-photon interference, Phys. Rev. Lett. 121, 250503 (2018).

3-26. C. You, M. Hong, P. Bierhorst, A. E. Lita, S. Glancy, S. Kolthammer, E. Knill, S. W. Nam, R. P. Mirin, O. S. Magana-Loaiza, and T. Gerrits, Scalable multiphoton quantum metrology with neither pre-nor post-selected measurements (2021), arXiv:2011.02454 [quant-ph].

3-27. V. Giovannetti, S. Lloyd, L. Maccone, and J. H. Shapiro, Sub-Rayleigh-diffraction-bound quantum imaging, Phys. Rev. A 79, 013827 (2009).

3-28. C. You, M. A. Quiroz-Juárez, A. Lambert, N. Bhusal, C. Dong, A. Perez-Leija, A. Javaid, R. d. J. León-Montiel, and O. S. Magaña-Loaiza, Identification of light sources using machine learning, Appl. Phys. Rev. 7, 021404 (2020).

3-29. L. Mandel, Sub-poissonian photon statistics in resonance fluorescence, Opt. Lett. 4, 205 (1979).

3-30. O. S. Magaña-Loaiza, R. d. J. León-Montiel, A. Perez-Leija, A. B. U'Ren, C. You, K. Busch, A. E. Lita, S. W. Nam, R. P. Mirin, and T. Gerrits, Multiphoton quantum state engineering using conditional measurements, npj Quantum Inf. 5, 80 (2019). 3-31. C. Gerry, P. Knight, and P. L. Knight, *Introductory quantum optics* (Cambridge university press, 2005).

3-32. E. C. G. Sudarshan, Equivalence of semiclassical and quantum mechanical descriptions of statistical light beams, Phys. Rev. Lett. 10, 277 (1963).

3-33. R. J. Glauber, The quantum theory of optical coherence, Phys. Rev. 130, 2529 (1963).

3-34. D. Svozil, V. Kvasnicka, and J. Pospichal, Introduction to multi-layer feed-forward neural networks, Chemometr Intell Lab 39, 43 (1997).

3-35. N. Bhusal, S. Lohani, C. You, M. Hong, J. Fabre, P. Zhao, E. M. Knutson, R. T. Glasser, and O. S. Magaña-Loaiza, Spatial mode correction of single photons using machine learning, Adv. Quantum Technol. 4, 2000103 (2021).

3-36. C. You, M. Hong, N. Bhusal, J. Chen, M. A. Quiroz-Juárez, F. Mostafavi, J. Guo, I. D. Leon, R. d. J. León-Montiel, and O. S. Magana-Loaiza, Observation of the modification of quantum statistics of plasmonic systems (2021), arXiv:2011.02454 [quant-ph].

3-37. I. Goodfellow, Y. Bengio, A. Courville, and Y. Bengio, *Deep learning*, Vol. 1 (MIT press Cambridge, 2016).

3-38. C. M. Bishop, *Pattern recognition and machine learning* (springer, 2006).

3-39. L. Massaron and A. Boschetti, *Regression Analysis with Python* (Packt Publishing Ltd, 2016).

4-1. R. J. Glauber, The quantum theory of optical coherence, Phys. Rev. 130, 2529 (1963).

4-2. E. C. G. Sudarshan, Equivalence of semiclassical and quantum mechanical descriptions of statistical light beams, Phys. Rev. Lett. 10, 277 (1963).

4-3. M. F. Møller, A scaled conjugate gradient algorithm for fast supervised learning, Neural Networks 6, 525 (1993).

4-4. S. Kullback and R. A. Leibler, On information and sufficiency, The Annals of Mathematical Statistics 22, 79 (1951).

4-5. S. Kullback, *Information theory and statistics* (Courier Corporation, 1997).

4-6. L. Prechelt, Early stopping—but when?, in *Neural Networks: Tricks of the Trade*, edited by G. B. Orr and K.-R. Müller (Springer Berlin Heidelberg, Berlin, Heidelberg, 1998) pp. 55-69.

4-7. P. S. Crowther and R. J. Cox, A method for optimal division of data sets for use in neural networks, in *Knowledge-Based Intelligent Information and Engineering Systems*, edited by R. Khosla, R. J. Howlett, and L. C. Jain (Springer Berlin Heidelberg, Berlin, Heidelberg, 2005) pp. 1-7.

5-1. O. S. Magana-Loaiza, and R. W. Boyd, "Quantum Imaging and Information", Reports on Progress in Physics, 82, 124401(2019).

5-2. C. You et al., and O. S. Magana-Loaiza, "Identification of Light Sources using Machine Learning", Applied Physics Reviews, 7, 021404 (2020).

5-3. M. Mirhosseini, O. S. Magana-Loaiza et al., "Compressive Direct Measurement of the Quantum Wavefunction", Physical Review Letters 113, 090402 (2014).

5-4. O. S. Magana-Loaiza et al., "Compressive Object Tracking using Entangled Photons", Applied Physics Letters, 102, 231104 (2013).

5-5. O. S. Magana-Loaiza et al., "Multiphoton Quantum-State Engineering using Conditional Measurements", Nature—NPJ Quantum Information 5, 80 (2019).

5-6. N. Bhusal et al., and O. S. Magana-Loaiza, "Spatial Mode Correction of Single Photons using Machine Learning", arXiv2006.07760 (2020).

5-7. M. Malik, O. S. Magana-Loaiza et al., "Quantum-secured imaging", Applied Physics Letters, 101, 241103 (2012).

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments of the disclosure may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

We claim:

1. A method for identification of light source types, comprising:

receiving reflected or scattered light by an object, the object being illuminated by light from a light source;

detecting, by a photon-number-resolving detector, individual photons in the light reflected or scattered by the object for a measurement time period to provide a times series of individual photon events;

segmenting said time series into a plurality of time bins;

determining a number of detected photons within each time bin of said plurality of time bins to provide a time series of photon counts per time bin;

determining a probability distribution P(n) from said time series of photon counts per time bin, said probability distribution providing a probability of detection of n photons, wherein n=0, 1, 2, . . . , $n_{max}$;

inputting each of values of P(n) as a $n_{max}$+1 component of a feature vector into a single neuron neural network, said single neuron neural network having been previously trained on a plurality of light source types; and receiving as output a classifier that has a value that identifies a light source type, wherein an average number of photons in said plurality of time bins is less than one photon; and identifying a type of the light source based on said detecting.

2. The method according to claim 1, wherein said light source type is one of a coherent light source or a thermal light source.

3. The method according to claim 2, wherein $n_{max}$=6 and said feature vector is a seven-component feature vector.

4. The method according to claim 3, wherein said single neuron neural network comprises an identity activation function and a binary classification given by a threshold function to indicate a class labeled as coherent on a first side of a threshold or a class labeled thermal on a second side of said threshold.

5. The method according to claim 2, wherein said plurality of time bins each have substantially equal temporal widths and have a value selected to correspond to a coherence time of said coherent light source.

6. The method according to claim 1, wherein said plurality of time bins is less than 100.

7. The method according to claim 1, wherein said plurality of time bins is less than 20.

8. The method according to claim 1, further comprising training said single neuron neural network prior to said identifying said light source type.

9. A light detection system for detecting light from a classified type of light source, comprising:

a light detector configured to detect individual photons from light reflected or scattered by an object illuminated by light from a light source; and a processing system configured to communicate with said light detector to receive signals to be processed, wherein said light detector is configured to detect the individual photons for a measurement time period to provide a times series of individual photon events, and wherein said processing system is configured to:

segment said time series into a plurality of time bins;

determine a number of detected photons within each time bin of said plurality of time bins to provide a time series of photon counts per time bin;

determine a probability distribution P(n) from said time series of photon counts per time bin, said probability distribution providing a probability of detection of n photons, wherein n=0, 1, 2, . . . , $n_{max}$;

input each of values of P(n) as a $n_{max}$+1 component of a feature vector into a single neuron neural network, said single neuron neural network having been previously trained on a plurality of light source types; and provide as output a classifier that has a value that identifies a light source type, wherein an average number of photons in said plurality of time bins is less than one photon, and wherein the processor is configured to identify a type of said light source based on the detected individual photons.

10. The light detection system according to claim 9, wherein said light source type is one of a coherent light source or a thermal light source.

11. The light detection system according to claim 10, wherein $n_{max}$=6 and said feature vector is a seven-component feature vector.

12. The light detection system according to claim 11, wherein said single neuron neural network comprises an identity activation function and a binary classification given by a threshold function to indicate a class labeled as coherent on a first side of a threshold or a class labeled thermal on a second side of said threshold.

13. The light detection system according to claim 10, wherein said plurality of time bins each have substantially equal temporal widths and have a value selected to correspond to a coherence time of said coherent light source.

14. The light detection system according to claim 9, wherein said plurality of time bins is less than 100.

15. An optical imaging system for forming images from a classified type of light source, comprising:

a plurality of light detectors arranged in a patterned array, each of the plurality of light detectors configured to detect individual photons from light reflected or scattered by an object illuminated by light from a light source; and a processing system configured to communicate with said plurality light detectors to receive signals to be processed to provide an image from said classified type of light source, wherein each of said plurality of light detectors is configured to detect individual photons for a measurement time period to provide a corresponding times series of individual photon events, and wherein said processing system is configured, for each of said plurality of light detectors, to:

segment each said time series into a plurality of time bins;

determine a number of detected photons within each time bin of said plurality of time bins to provide a corresponding time series of photon counts per time bin;

determine a probability distribution P(n) from each said time series of photon counts per time bin, said probability distribution providing a probability of detection of n photons, wherein n=0, 1, 2, . . . , $n_{max}$;

input each of values of P(n) as a $n_{max}$+1 component of a feature vector into a single neuron neural network, said single neuron neural network having been previously trained on a plurality of light source types; and provide as output a classifier that has a value that identifies a light source type, wherein an average number of photons in said plurality of time bins is less than one photon, wherein the processing system is configured to identify a type of said light source based on the detected individual photons.

16. The optical imaging system according to claim 15, wherein said light source type is one of a coherent light source or a thermal light source.

17. The optical imaging system according to claim 16, wherein $n_{max}$=6 and said feature vector is a seven-component feature vector.

18. The optical imaging system according to claim 17, wherein said single neuron neural network comprises an identity activation function and a binary classification given by a threshold function to indicate a class labeled as coherent on a first side of a threshold or a class labeled thermal on a second side of said threshold.

19. The optical imaging system according to claim 16, wherein said plurality of time bins each have substantially equal temporal widths and have a value selected to correspond to a coherence time of said coherent light source.

20. The optical imaging system according to claim 15, wherein said plurality of time bins is less than 100.

\* \* \* \* \*